United States Patent
Limpibunterng et al.

(10) Patent No.: US 8,762,005 B2
(45) Date of Patent: Jun. 24, 2014

(54) CONTROL DEVICE AND CONTROL METHOD FOR VEHICLE

(75) Inventors: Theerawat Limpibunterng, Susono (JP); Yoshiaki Tsuchiya, Miyoshi (JP); Shoji Asai, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/496,978

(22) PCT Filed: Jun. 24, 2011

(86) PCT No.: PCT/IB2011/001477
§ 371 (c)(1),
(2), (4) Date: Mar. 19, 2012

(87) PCT Pub. No.: WO2011/161535
PCT Pub. Date: Dec. 29, 2011

(65) Prior Publication Data
US 2013/0190988 A1     Jul. 25, 2013

(30) Foreign Application Priority Data
Jun. 25, 2010  (JP) ................................. 2010-144850

(51) Int. Cl.
*B62D 6/00* (2006.01)
*B62D 5/00* (2006.01)
*B62D 15/02* (2006.01)

(52) U.S. Cl.
CPC ................ *B62D 5/008* (2013.01); *B62D 5/005* (2013.01); *B62D 15/025* (2013.01)
USPC .................. 701/42; 701/41; 701/87; 180/6.2; 180/204

(58) Field of Classification Search
CPC ........ B62D 6/008; B62D 5/005; B62D 15/025
USPC ............... 701/41, 42, 79, 81, 84, 87; 180/6.2, 180/204; 192/70.17
See application file for complete search history.

(56) References Cited

U.S. PATENT DOCUMENTS 4,881,700 A   11/1989  Sarh
4,986,493 A    1/1991  Sarh
(Continued)

FOREIGN PATENT DOCUMENTS

EP   2 050 653 A1   4/2009
JP   A-10-152063    6/1998
(Continued)

OTHER PUBLICATIONS

Database WPI, Week 200758, Thomson Scientific, London, GB; AN 2007-608172, XP000002658803, published on Jun. 28, 2007.

(Continued)

*Primary Examiner* — Gertrude Arthur Jeanglaud
(74) *Attorney, Agent, or Firm* — Oliff PLC

(57) ABSTRACT

In control of a vehicle that is provided with a steering torque supply device that supplies a steering torque to a steering device coupled to a steered wheel and a steering transmission ratio variation device that changes a steering transmission ratio, the control includes: setting a target state quantity for keeping the vehicle in a target lane; controlling the steering transmission ratio variation device so that a state quantity of the vehicle becomes the set target state quantity; controlling the steering torque supply device so that a steering reaction restriction torque that restricts a steering reaction torque generated in the steering device is supplied with the steering device as the steering torque when the vehicle is kept within the target lane; and correcting the steering reaction restriction torque on the basis of a steering input when the steering input from a driver of the vehicle is produced.

8 Claims, 11 Drawing Sheets

(56) References Cited

U.S. PATENT DOCUMENTS

| | | | |
|---|---|---|---|
| 5,896,942 A * | 4/1999 | Bohner et al. ............... 180/402 |
| 6,091,214 A * | 7/2000 | Yamawaki et al. ............ 318/52 |
| 6,212,453 B1 | 4/2001 | Kawagoe et al. |
| 6,263,270 B1 | 7/2001 | Sato et al. |
| 6,789,008 B2 | 9/2004 | Kato et al. |
| 7,206,684 B2 | 4/2007 | Takeda |
| 7,305,285 B2 | 12/2007 | Villaume et al. |
| 7,809,483 B2 | 10/2010 | Nishikawa |
| 8,392,064 B2 | 3/2013 | Thrun et al. |
| 2003/0213640 A1 | 11/2003 | Kato et al. |
| 2005/0027402 A1 | 2/2005 | Koibuchi et al. |
| 2005/0267661 A1 | 12/2005 | Iwazaki et al. |
| 2006/0142921 A1 | 6/2006 | Takeda |
| 2007/0192005 A1 | 8/2007 | Ishikawa et al. |
| 2007/0225914 A1 | 9/2007 | Kawazoe et al. |
| 2008/0091318 A1 | 4/2008 | Deng et al. |
| 2008/0091321 A1 | 4/2008 | Nishikawa |
| 2008/0195275 A1 | 8/2008 | Kojo et al. |
| 2010/0114431 A1 | 5/2010 | Switkes et al. |
| 2010/0168963 A1 | 7/2010 | Yamamoto |
| 2010/0256869 A1 | 10/2010 | Lich et al. |
| 2011/0264329 A1 * | 10/2011 | Limpibunterng et al. ...... 701/41 |
| 2012/0029773 A1 | 2/2012 | Fujita et al. |
| 2012/0109411 A1 | 5/2012 | Tokimasa et al. |
| 2012/0109414 A1 | 5/2012 | Kumabe et al. |
| 2012/0109460 A1 | 5/2012 | Tokimasa et al. |
| 2012/0123642 A1 | 5/2012 | Kojo |
| 2012/0123643 A1 | 5/2012 | Limpibuntering et al. |
| 2012/0197496 A1 | 8/2012 | Limpibunterng et al. |
| 2012/0203431 A1 | 8/2012 | Kojo et al. |
| 2012/0215406 A1 * | 8/2012 | Tanimoto et al. ............... 701/42 |
| 2012/0226417 A1 | 9/2012 | Nishikawa |
| 2012/0253602 A1 | 10/2012 | Fujita et al. |
| 2012/0303217 A1 | 11/2012 | Reichel et al. |
| 2013/0190988 A1 | 7/2013 | Limpibunterng et al. |

FOREIGN PATENT DOCUMENTS

| | | |
|---|---|---|
| JP | A-11-78934 | 3/1999 |
| JP | A-11-245832 | 9/1999 |
| JP | A-2000-142441 | 5/2000 |
| JP | 2004-098744 A | 4/2004 |
| JP | A-2005-153779 | 6/2005 |
| JP | A-2005-172528 | 6/2005 |
| JP | A-2005-343184 | 12/2005 |
| JP | A-2006-143101 | 6/2006 |
| JP | 2006-206011 A | 8/2006 |
| JP | A-2007-160998 | 6/2007 |
| JP | A-2007-302017 | 11/2007 |
| JP | A-2008-13123 | 1/2008 |
| JP | A-2008-44427 | 2/2008 |
| JP | A-2008-120338 | 5/2008 |
| JP | A-2008-137612 | 6/2008 |
| JP | A-2008-162566 | 7/2008 |
| JP | A-2008-174013 | 7/2008 |
| JP | A-2008-213522 | 9/2008 |
| JP | A-2009-190464 | 8/2009 |
| JP | A-2009-226981 | 10/2009 |
| JP | A-2010-89692 | 4/2010 |
| JP | A-2010-120532 | 6/2010 |
| JP | A-2011-031769 | 2/2011 |
| JP | A-2011-031770 | 2/2011 |
| WO | WO 2010/073400 A1 | 7/2010 |
| WO | WO 2011/161777 A1 | 12/2011 |

OTHER PUBLICATIONS

Database WPI, Week 200641, Thomson Scientific, London, GB; AN 2006-396005, XP000002658804, published Jun. 8, 2006.
International Search Report issued in International Patent Application No. PCT/IB2011/001477 dated Sep. 23, 2011.
Written Opinion of the International Searching Authority issued in International Patent Application No. PCT/IB2011/001477 dated Sep. 23, 2011.
U.S. Appl. No. 13/141,875, filed Jun. 23, 2011 in the name of Limpibunterng et al.
Apr. 11, 2013 Office Action issued in U.S. Appl. No. 13/141,875.
Notice of Allowance in U.S. Appl. No. 13/502,760 mailed Aug. 14, 2013.
Notice of Allowance in U.S. Appl. No. 13/386,059 mailed Sep. 5, 2013.
May 13, 2013 Office Action issued in U.S. Appl. No. 13/502,760.
May 15, 2013 Office Action issued in U.S. Appl. No. 13/386,059.
Office Action issued in U.S. Appl. No. 13/141,875 mailed Dec. 19, 2013.

* cited by examiner

CONTROL DEVICE AND CONTROL METHOD FOR VEHICLE

BACKGROUND OF THE INVENTION

1. Field of the Invention

The invention relates to a technical field of control devices and control methods for vehicles that can perform driver assisted control of various types, such as Lane Keeping Assist (LKA) in a vehicle equipped with various steering assisted devices such as Electronic controlled Power Steering (EPS), Variable Gear Ratio Steering (VGRS), and Active Rear Steering (ARS).

2. Description of Related Art

The device of such kind that causes the vehicle to perform lane keeping travel by using an electric power steering device and a steering angle variation device has been suggested (see, for example, Japanese Patent Application Publication No. 2007-160998 (JP-A-2007460998)). With the steering control device for a vehicle disclosed in JP-A-2007460998, the electric power steering device is controlled so as to obtain the target steering angle based on the curvature radius during lane keeping travel and the shift of vehicle position in the transverse direction with respect to the lane or the yaw angle is controlled by the steering angle variation device, thereby making it possible to keep the vehicle effectively within the target lane.

Setting a target steering angle $\Delta\delta t$ on the basis of the target steering angle $\Delta\delta t1$ for keeping the Vehicle within the target lane and the target steering angle $\Delta\delta ts$ for bringing the vehicle behavior close to the standard state is also conventional (see, for example, Japanese Patent Application Publication No. 2006443101 (JP-A-2006-143101)).

When the vehicle is kept within the target lane by the steering angle control of turning wheels, the turning wheels that are the objects of steering angle control may be steered wheels (wheels coupled to the steering device, preferably front wheels) or non-steered wheels, and steering reaction torques of various kinds are generated in the steering device mechanically coupled to the steered wheels (this is a general concept of devices that transmit a steering input to steered wheels, these devices including various steering input devices such as a steering transmission mechanism, various steering shafts, and a steering wheel).

Since the steering reaction torque acts in the direction of interfering with the desired steering angle variation, the vehicle behavior will be disturbed, for example, by steering with the steering input device in the opposite steering direction, and keeping the vehicle within the target lane can be difficult, unless certain measures are taken against such steering reaction torque.

In the device disclosed in JP-A-2007-160998, although a plurality of steering devices, namely, an electric power steering device and a steering angle variation device are used, each device is merely individually responsible for part of the control relating to lane keeping and therefore the effect of such steering reaction torque is difficult to eliminate. Therefore, in actual operation, the driver should supply to the steering device a steering maintaining torque that acts against such steering reaction torque, and the so-called hands-free operation is difficult to realize.

In particular, the steering maintaining torque that is necessary when the driver maintains the steering of the steering input device changes in response to the steering reaction torque that varies regardless of the driver's intensions. Therefore, when the driver provides the steering maintaining torque via the steering input device, it is practically close to impossible to eliminate the possibility of the driver getting uncomfortable and the decrease in drivability is difficult to avoid.

Thus, with the device disclosed in JP-A-2007-160998, the decrease in drivability is difficult to avoid when the vehicle is kept within the target lane. The same is true for JP-A-2006443101 that neither discloses nor suggests the steering reaction torque.

SUMMARY OF THE INVENTION

The invention provides a control device and control method for a vehicle that can keep the vehicle within the target lane, without decreasing drivability.

The first aspect of the invention relates to a control device that controls a vehicle provided with a steering torque supply device that supplies a steering torque to a steering device coupled to a steered wheel and a steering transmission ratio variation device that changes a steering transmission ratio. The control device includes: a setting unit that sets a target state quantity for keeping the vehicle in a target lane; a first control unit that controls the steering transmission ratio variation device so that a state quantity of the vehicle becomes the set target state quantity; a second control unit that controls the steering torque supply device so that a steering reaction restriction torque that restricts a steering reaction torque generated in the steering device is supplied with the steering device as the steering torque when the vehicle is kept within the target lane; and a correction unit that corrects the steering reaction restriction torque on the basis of a steering input when the steering input from a driver of the vehicle is produced.

The vehicle according to the first aspect of the invention is provided with the steering torque supply device and the steering transmission ratio variation device.

The steering torque supply device according to the first aspect of the invention is a device that supplies a steering torque to a steering device, for example, an electronically controlled power steering device.

The "steering device" according to the first aspect of the invention is a concept including a variety of steering input devices such as a steering wheel by which the driver provides a steering input and encompassing devices that can be physically or mechanically coupled to steered wheels and transmit physically the steering input to the steered wheels. The "steering torque" according to the first aspect of the invention means a torque causing variation in a steering angle of the steered wheels that acts in the steering device according to such a concept.

Where such a concept is considered, a steering device that is not in a physical coupling relationship with the steering input device is different at least from the steering device according to the first aspect of the invention. This is because no action restricting the below-described steering reaction torque transmitted to the driver via the steering device according to the first aspect of the invention is obtained, regardless of how the control is performed with respect to the torque causing variation in a steering angle of the steered wheels that are not in a coupling relationship with the steering input device.

Further, where such a concept is considered, a torque provided humanly by the driver via various steering input devices can also be a steering torque of some kind, but such humanly provided steering torque is distinguished, at least in the application, as the "input torque from the driver".

The steering transmission ratio variation device means a device that changes a steering transmission ratio in a binary, multistage, or continuous manner, for example, a front wheel steering angle variation device such as VGRS or a rear wheel steering angle variation device such as ARS.

The "steering transmission ratio" as referred to herein means a ratio of the steering angle of steered wheel (the steered wheels in this case are not limited to the wheels for which the variation of steering angle is provided by the aforementioned steering torque) and the steering angle (that is, it means the operation angle of the steering input device (to come to the point, the rotation angle of the steering wheel)). Therefore, the steering transmission ratio variation device can control the steering angle of front wheels, rear wheels, or both the front wheels and the rear wheels independently from the operation state of the steering input device and theoretically can change the advance direction of the vehicle, regardless of the driver's intention, for example, when the driver stops controlling the steering input device or only when the steering input device is steered.

From the standpoint of physical configuration, at least part of the steering torque supply device and steering transmission ratio variation device may be common with or double as the steering device of the above-described concept.

The control device for a vehicle according to the invention controls such a vehicle may include various storage devices such as one or a plurality of Central Processing Units (CPUs), Micro Processing Units (MPUs), other processors or controllers, or Read Only Memory (ROM), Random Access Memory (RAM), buffer memory or flash memory, and can be in the form of various processing units, e.g. a single Electronic Control Unit (ECU) or a plurality of such units, various controllers, and various computer systems such as a microcomputer device.

With the control device for a vehicle according to the first embodiment of the invention, a target state quantity for keeping the vehicle within the target lane is set by the setting unit when the device is operated.

The "target state quantity" according to the first embodiment of the invention is a target value of the state quantity of the vehicle. Further, the "state quantity of the vehicle" relating to the target state quantity is a state quantity that makes it possible to demonstrate a practically useful effect when realizing such feature of keeping the vehicle within the target lane. One preferred example of the state quantity of the vehicle can be a state quantity that determines the turning behavior of the vehicle. Thus, the state quantity of the vehicle includes values corresponding, for example, to a yaw rate, a vehicle body slip angle (angle of the vehicle with respect to the turning tangent direction; represents an angle formed by the vehicle body direction and the instantaneous advance direction of the vehicle body), or a transverse acceleration.

In the first aspect of the invention, the target state quantity is set on the basis of a position state difference as a physical quantity that can be a reference value for keeping the vehicle within the target lane (that is the difference that determines the relative positional relationship between the vehicle and the target lane in which the vehicle should be kept, more specifically as a preferred example, a lateral vehicle positional difference with respect to the target lane or a yaw-angle difference) or on the basis of the position state difference and with reference to the travel conditions such as a vehicle speed. In this case, the target state quantity may be mapped in association with a variety of parameter values and stored in advance in the appropriate storage device, or may be derived as necessary by an appropriate computational algorithm or computational formulas.

In the control device for a vehicle according to the invention, when the target state quantity is thus set, the steering transmission ratio variation device is controlled by the first control unit so that the state quantity of the vehicle becomes the preset target state quantity.

As long as the steering angle control of the steered wheels performed by the steering transmission ratio variation device can function significantly, when keeping the vehicle within the target lane, it is not necessary for the first control unit to move the state quantity of the vehicle toward the target state quantity only by the action of the steering transmission ratio variation device. Thus, as long as at least part of the steering angle variation of the steered wheels that is necessary when the vehicle is kept within the target lane is ensured by the steering transmission ratio variation device, the ratio of the steering angle variation quantity provided by the control performed by the first control unit in the required steering angle variation quantity is not particularly limited.

More specifically, an optimum and advantageous steering angle is not uniquely determined when the vehicle is kept within the target lane, and the steering transmission ratio variation device does not have a function of switching the steering input device to the desired steering direction (the below-described steering reaction torque is a torque acting in the undesirable steering direction). Therefore, when a constant or variable angle value that is not equal to zero is adequate as a steering angle, from the practical standpoint a cooperative control mode will be also sufficiently beneficial. In this mode, the steering angle variation quantity is appropriately loaded by the steering transmission ratio variation device, while supplying the steering torque, for example, via the appropriate steering torque supply device and providing the desired steering angle variation and the wheel steering angle variation resulting therefrom by the steering torque.

When the turning behavior of the vehicle is controlled by controlling the state quantity of the vehicle and the vehicle is kept within the target lane by automatic steering of some kind, a steering reaction torque caused by a variety of factors can act in the steering device. Examples, of those factors include various physical characteristics as concepts that can appropriately include inertia resistance, viscous resistance, and friction resistance of the steering device itself, various physical characteristics of similar types in the steering torque supply device, or a self-aligning torque of the steered wheels. The steering reaction torque is a reaction torque that acts to rotate the steering input device in the direction opposite the original turning direction and therefore can affect the operation control of the vehicle by turning the steering input device in the opposite direction in the so-called hands-free traveling mode in which the driver does not provide a steering maintaining force.

In order to resolve this problem, in the control device for a vehicle according to the first aspect of the invention, a steering reaction torque restriction torque is supplied as at least part of the abovementioned steering torque by the second control unit via the steering torque supply device. The steering reaction restriction torque is a torque that restricts the steering reaction torque, preferably a torque that cancels the steering reaction torque, or reduces the steering reaction torque to a level that causes no problems for vehicle travel control even when the driver does not provide a steering maintaining torque. Where the steering reaction restriction torque and steering reaction torque thus cancel each other, the vehicle can be kept without a hindrance within the target lane even when a steering maintaining torque that acts against at least the steering reaction torque is not provided and, ideally, hands are taken off the steering input device.

However, an operation of the steering input device based on the driver's intention, that is, an override operation, can occur in the process of keeping the vehicle within the target lane implemented by the first and second control units. The override operations can be of at least two types: an override operation of a comparatively large scale that should stop the control aimed at keeping the vehicle within the target lane and an override operation of a comparatively small scale that reflects the driver's intentions in the control aimed at keeping the vehicle within the target lane.

In the latter case, by contrast with the former case, the vehicle is continuously kept within the target lane. As a result, an event can occur in which the override operation performed by the driver and the supply of the above-described steering reaction restriction torque via the steering torque supply device will interfere with each other within a period that cannot be ignored from the practical standpoint and at a scale that cannot be ignored from the practical standpoint. Since the steering reaction restriction torque is a torque supplied regardless of the driver's intentions and corresponding to automatic steering that persistently tries to keep the vehicle within the target lane, where such interference occurs, the steering torque generated in the steering input device changes and a steering feeling is degraded, regardless of whether the driver provides a constant steering-input.

Accordingly, in the control device for a vehicle according to the first aspect of the invention, such degradation of steering feeling is restricted in the below-described manner. Thus, the control device for a vehicle according to the first aspect of the invention is configured to include a correction unit that corrects the steering reaction restriction torque on the basis of steering input when such steering input is produced by the driver.

The "steering input from the driver" as referred to herein means a physical input reflecting a steering intention of the driver that is provided via the steering input device. From the practical standpoint, the steering input can be in the form of various physical quantities and control quantities that can determine the input. For example, the steering input can include, as appropriate, a drive input torque equivalent value, a steering angle equivalent value, a steering angle speed equivalent value, and a steering angle acceleration equivalent value. Further, a steering direction provided by the driver can be also handled as a steering input of this kind.

The steering reaction restriction torque makes it possible to realize the restriction of steering reaction torque including the steering input from the driver and to restrict the degradation of steering feeling by correcting the steering reaction restriction torque on the basis of the steering input from the driver that can be in these various forms.

Thus, a new problem discovered when the override operation is performed by the driver, while the control keeping the vehicle within the target lane is being maintained, is that not only the steering reaction torque caused by keeping the vehicle within the target lane, but also the steering reaction restriction torque designed to restrict this steering reaction torque can become a steering load making the driver uncomfortable, and in the control device for a vehicle according to the first aspect of the invention, the degradation of steering feeling is restricted based on a technical idea of incorporating a steering input corresponding to the override operation into the control process of the steering reaction restriction torque. Therefore, a significant practical advantage is clearly attained over any technical idea that does not take this problem into account.

The mode of correction to be performed by the correction unit is not restricted in any way, provided that the steering feeling of the driver is improved by comparison with that in the case without any correction. Further, the operation of the correction unit may be performed within a region outside the operation scope that is generally suggested by the wording "correction". For example, the operations of the correction unit and the second control unit may proceed integrally with each other, at least partially, in the control process. Alternatively, the operation relating to the correction unit of this kind may be performed as an operation of the second control unit.

Further, the correction unit may ensure the desired steering feeling for the override operation by maintaining the sum total of the steering reaction restriction torque and steering reaction torque (these torques have mutually different signs) at the desired value, or converging the sum total or bringing it close to the desired value. Thus, the steering reaction restriction torque may be controlled so that the override operation could be performed in a substantially load-free mode, and the steering reaction restriction torque may be also controlled so that a constant steering load (corresponds to the so-called "response feel") is applied.

In the control device for a vehicle according to the first aspect of the invention, the correction unit may correct the steering reaction restriction torque on the basis of a steering direction relating to the steering input.

The friction resistance of the steering device or steering torque supply device that can determine the steering reaction torque is different from the inertia resistance or viscous resistance and changes between two values in response to the sign of steering direction (means the sign of the steering angle speed). Therefore, it can also be necessary to change the steering reaction restriction torque between two values in response to the sign of steering direction. Therefore, when the generation direction of the steering reaction restriction torque that restricts the steering reaction torque generated because the vehicle is kept within the target lane is different from the override direction (that is the driver's steering input), the steering load on the driver can change rapidly in the override operation process.

With such a configuration, since the steering reaction restriction torque is corrected on the basis of the steering direction that means the driver input torque generation direction, the effect of the steering reaction restriction torque, in particular, relating to the friction resistance of this type on the steering feeling can be moderated and the deterioration of the steering feeling can be advantageously restricted.

In the control device for a vehicle according to the first aspect of the invention, the steering input may be an input torque from the driver, and the correction unit may correct the steering reaction restriction torque on the basis of the input torque.

With such a configuration, since the steering reaction restriction torque is corrected on the basis of the driver input torque, the deterioration of the steering feeling can be advantageously restricted.

The equation of motion dearly demonstrates that the steering force corresponding to the driver input torque is proportional to the steering angle acceleration. Therefore, the correction unit may correct the steering reaction restriction torque on the basis of angle acceleration relating to the steering input (that is, the below-described second order derivative of the driver input angle with respect to time).

Further, since the steering angle acceleration can determine the inertial resistance of the steering device and the steering torque supply device, when the steering reaction restriction torque is corrected on the basis of the steering angle acceleration of this kind, the effect produced by the steering reaction restriction torque relating to the inertia resistance of this kind on the steering feeling can be moderated.

In the control device for a vehicle according to the first aspect of the invention, the steering input may be an input angle from the driver, and the correction unit may correct the steering reaction restriction torque on the basis of the input angle.

With such a configuration, since the steering reaction restriction torque is corrected on the basis of the driver input angle, the deterioration of the steering feeling can be advantageously restricted.

The "input angle from the driver" as referred to herein means a steering angle provided by the diver and represents part of the steering angle. However, the steering angle itself can be changed, regardless of the driver's intentions, by the supply of the steering torque from the steering torque supply device, as mentioned hereinabove, and in the application, the steering angle provided by a human operation of this kind is classified as the driver input angle.

The steering angle determines steering angle variation of the steered wheels, but steering angle variations correlate with the axial force generated in the steered wheels. Therefore, by correcting the steering reaction restriction torque on the basis of driver input angle, which is one form of a steering angle, it is possible to moderate the effect produced on the steering feeling by the steering reaction restriction torque that is supplied to restrict the steering reaction torque relating to the axial force of this kind.

The control device for a vehicle according to the first aspect of the invention may further include a third control unit that controls the steering torque supply device so that a predetermined pseudo steering reaction torque corresponding to the steering input is supplied as the steering torque.

With such a configuration, since the pseudo steering reaction torque is supplied by the third control unit, the desired steering feeling can be realized. Such desired steering feeling can be also created by the operation of the correction unit in the above-described manner or by the cooperative action of the correction unit and the second control unit, but where the desired steering feeling is thus created separately by the pseudo steering reaction torque, the correction unit or the second control unit may eliminate or substantially eliminate the entire steering reaction torque that takes even the steering input into account, and such an approach is preferred from the standpoint of control load.

In the control device for a vehicle according to the first aspect of the invention, the second control unit may supply the steering reaction restriction torque so as to restrict at least one reaction torque from among a first steering reaction torque caused by physical characteristics of the steering device, a second steering reaction torque caused by physical characteristics of the steering torque supply device, and a third steering reaction torque caused by an axial force of the steered wheels.

With such a configuration, the first, second, and third steering reaction torque are used as elements determining the steering reaction torque. The first steering reaction torque is a steering reaction torque generated due to various physical characteristics, for example, inertia resistance, viscous resistance, and friction resistance in the steering device, the second steering reaction torque is a steering reaction torque generated due to various physical characteristics, for example, the inertia resistance, viscous resistance, and friction resistance in the steering torque supply device, and the third steering reaction torque is a steering reaction torque generated due to the axial force of the steered wheels.

These steering reaction torques are the main elements of the steering reaction torque generated when the vehicle is kept within the target lane, and the steering reaction restriction torque is supplied with the object of restricting at least part thereof, preferably the entire torques. Therefore, the correction torque is a torque that corrects the steering reaction restriction torque restricting at least part of these torques, and eventually the deterioration of steering feeling during override operation can be effectively restricted.

In the control device according to the first aspect of the invention, the second control unit may supply the steering reaction restriction torque so as to restrict at least one reaction torque from among a first steering reaction torque caused by physical characteristics of the steering device and a second steering reaction torque caused by physical characteristics of the steering torque supply device.

The second aspect of the invention relates to a control method for a vehicle provided with a steering torque supply device that supplies a steering torque to a steering device coupled to steered wheels and a steering transmission ratio variation device that changes a steering transmission ratio. The control method includes setting a target state quantity for keeping the vehicle in a target lane; controlling the steering transmission ratio variation device so that a state quantity of the vehicle becomes the set target state quantity; controlling the steering torque supply device so that a steering reaction restriction torque that restricts a steering reaction torque generated in the steering device is supplied with the steering device as the steering torque when the vehicle is kept within the target lane; and correcting the steering reaction restriction torque on the basis of a steering input when the steering input from a drive of the vehicle is produced.

The operation and other advantages of the first and second aspects of the invention will be described below in greater details in the DETAILED DESCRIPTION OF EMBODIMENTS.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the Invention

An embodiment of the traveling assist device for a vehicle according to the invention will be described below with reference to the appended drawings.

Configuration According to the Embodiment

Figure 1:
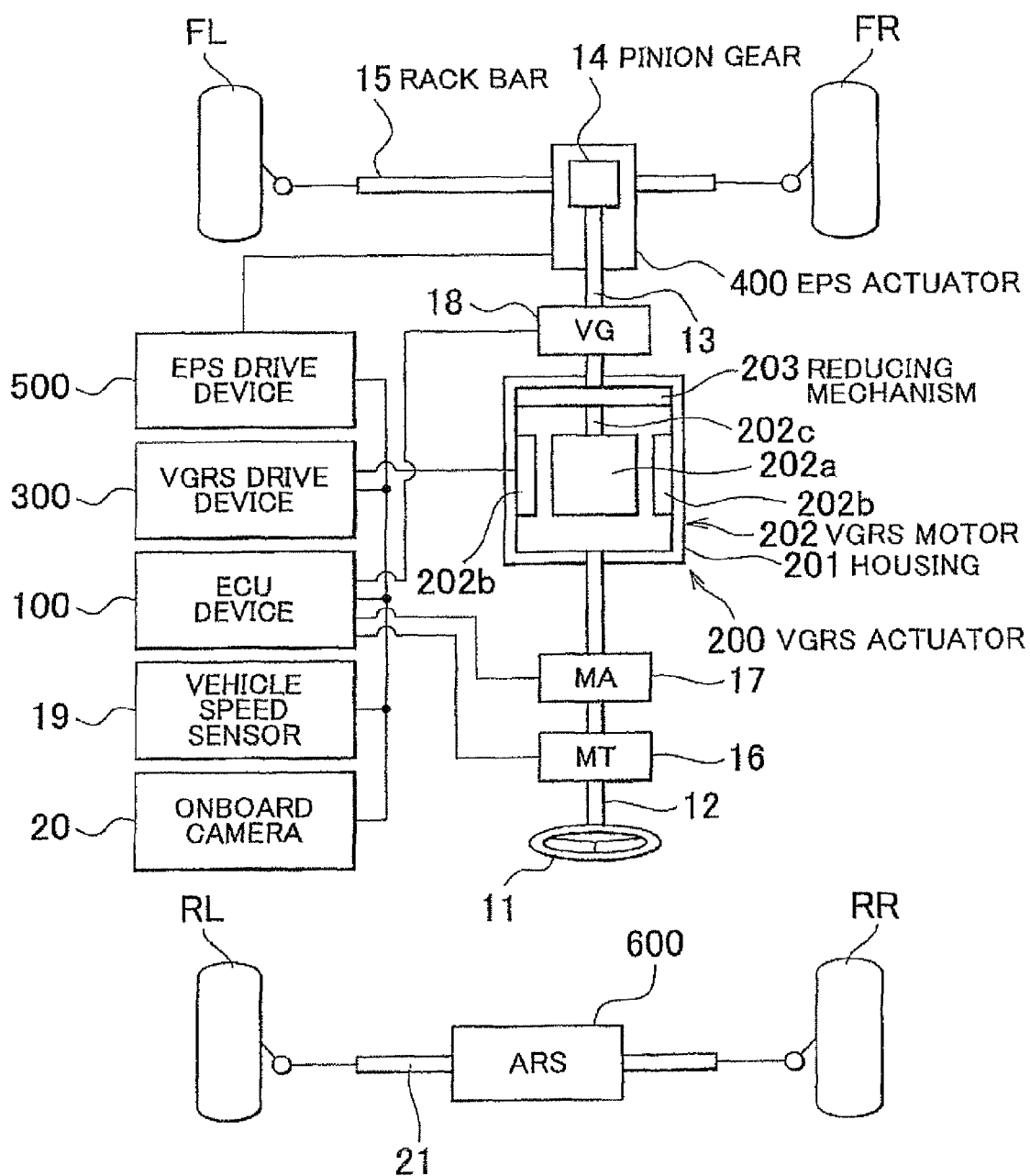
FIG. 1 is a schematic configuration diagram representing schematically the configuration of the vehicle according to one embodiment of the invention.

First, the configuration of a vehicle 10 according to one embodiment of the invention will be described below with reference to FIG. 1. FIG. 1 is a schematic configuration diagram representing schematically the basis configuration of the vehicle 10.

Referring to FIG. 1, the vehicle 10 is an example of the "vehicle" according to the invention that has a pair of left and right front wheels FL and PR and a pair of left and right rear wheels RL and RR as steered wheels and in which the vehicle advance direction is controlled by steering these steered wheels. The vehicle 10 is provided with an Electronic Control Unit (ECU) 100, a Variable Gear Ratio Steering (VGRS) actuator 200, a VGRS drive device 300, an Electronic controlled Power Steering (EPS) actuator 400, an EPS drive device 500, and an Active Rear Steering (ARS) actuator 600.

The ECU 100 is an ECU that is provided with a Central Processing Unit (CPU), Read Only Memory (ROM), and Random Access Memory (RAM) (not shown in the figure) and configured to be capable of controlling the entire operation of the vehicle 10. This ECU is an example of the "vehicle controller" according to the invention. The ECU 100 is configured to be capable of executing the below-described Lane Keeping Assist (LKA) control, front-rear wheel steering angle control, and electric controlled power steering (EPS) control in accordance with the control program stored in the ROM.

The ECU 100 is an integrated ECU configured to function as respective examples of the "setting unit", "first control unit", "second control unit", "correction unit", and "third control unit" in accordance with the invention. All of the operations of these units are executed by the ECU 100. However, physical, mechanical, and electrical configurations of these units according to the embodiment of the invention are not limited to the aforementioned ECU and for example, these units may be configured as various computer systems such as a plurality of ECU, various processing units, various controllers, or microcomputer devices.

In the vehicle 10, the steering input provided by the driver via a steering wheel 11 serving as a steering input device is transmitted to an upper steering shaft 12 that is coupled to the steering wheel 11. The steering wheel 11 and the upper steering shaft 12 can rotate coaxially. The upper steering shaft 12 serves as a shaft body capable of rotating in the same direction as the steering wheel 11. A downstream end of the upper steering shaft 12 is coupled to the VGRS actuator 200.

The VGRS actuator 200 is provided with a housing 201, a VGRS motor 202, and a reducing mechanism 203 and is an example of the "steering transmission ratio variation device" according to the invention.

The housing 201 is a housing of the VGRS actuator 200 that accommodates the VGRS motor 202 and the reducing mechanism 203. The downstream end of the aforementioned upper steering shaft 12 is fixed to the housing 201, and the housing 201 can rotate integrally with the upper steering shaft 12.

The VGRS motor 202 is a direct current (DC) brushless motor having a rotor 202a serving as a rotating component, a stator 202b serving as a stationary component, and a rotating shaft 202c as a drive power output shaft. The stator 202b is fixed inside the housing 201, and the rotor 202a is held rotatably inside the housing 201. The rotating shaft 202c is fixed to the rotor 202a so that the two can rotate coaxially, and a downstream end of the rotating shaft 202c is coupled to the reducing mechanism 203.

The reducing mechanism 203 is a planetary gear mechanism having a plurality of rotating elements (sun gear, carrier, ring gear) that can rotate differentially. Among the plurality of rotating elements, the sun gear serving as the first rotating element is coupled to the rotating shaft 202c of the VGRS motor 202, and the carrier serving as the second rotating element is coupled to the housing 201. The ring gear serving as the third rotating element is coupled to a lower steering shaft 13.

With the reducing mechanism 203 having such a configuration, the rotation speed of the lower steering shaft 13 coupled to the ring gear serving as the one remaining rotating element is uniquely determined by the rotation speed of the upper steering shaft 12 corresponding to the operation quantity of the steering wheel 11 (that is, the rotation speed of the housing 201 coupled to the carrier) and the rotation speed of the VGRS motor 202 (that is, the rotation speed of the rotating shaft 202c coupled to the carrier). In this case, the rotation speed of the lower steering shaft 13 can be controlled by controlling the rotation speed of the VGRS motor 202 by the differential action between the rotating elements.

Thus, the upper steering shaft 12 and the lower steering shaft 13 can be rotated relative to each other by the action of the VGRS motor 202 and the reducing mechanism 203. Further, because of the configuration of rotating elements in the reducing mechanism 203, the rotation speed of the VGRS motor 202 is transmitted to the lower steering shaft 13 after being reduced according to a predetermined reduction ratio determined according to the gear ratio between the rotating elements.

Thus, in the vehicle 10, since the upper steering shaft 12 and the lower steering shaft 13 can rotate relative to each other, a steering transmission ratio K1 which is a ratio of the steering angle $\theta_{MA}$, which is a rotation quantity of the upper steering shaft 12, and a front wheel steering angle $\delta_f$, which is uniquely determined correspondingly to the rotation quantity of the lower steering shaft 13 (also relates to the gear ratio of the below-described rack-and-pinion mechanism) can be continuously changed in a predetermined range.

The reducing mechanism 203 may also have a configuration other than that of the planetary gear mechanism shown hereinabove by way of example (for example, a configuration may be used in which gears with different numbers of teeth are coupled to the upper steering shaft 12 and the lower steering shaft 13, a flexible gear is disposed in partial contact with the aforementioned gears, and the upper steering shaft 12 and the lower steering shaft 13 are rotated relative to each other by rotating the flexible gear by a motor torque transmitted via a wave generator), or when a planetary gear mechanism is used, it may have physical, mechanical, or structural features different from those described above.

The VGRS drive device 300 is an electric drive circuit including a pulse width modulation (PWM) circuit, a transistor circuit, and an inverter and configured to be capable of supplying a current to the stator 202b of the VGRS motor 202. The VGRS drive device 300 is electrically connected to a battery (not shown in the figure) configured so that a drive voltage can be supplied to the VGRS motor 202 by electric power supplied from the battery. Further, the VGRS drive device 300 is electrically connected to the ECU 100 and the operation of the drive device is controlled by the ECU 100. The VGRS drive device 300 together with the VGRS actuator 200 constitute an example the "of steering transmission ratio variation device" in accordance with the invention.

The rotation of the lower steering shaft 13 is transmitted to the rack-and-pinion mechanism. The rack-and-pinion mechanism is a steering force transmission mechanism including a pinion gear 14 connected to the downstream end of the lower steering shaft 13 and a rack bar 15 having formed thereon gear teeth for meshing with the gear teeth of the pinion gear. The rack-and-pinion mechanism is configured so that the rotation of the pinion gear 14 is converted into the movement of the rack bar 15 in the left-right direction shown in the figure, thereby transmitting a steering force to the front wheels via a tie rod and a knuckle (reference numerals thereof are omitted) coupled to both ends of the rack bar 15. Thus, the device for transmitting the steering force from the steering wheel 11 to the front wheels is an example of the "steering device" in accordance with the invention.

The EPS actuator 400 is an example of the "steering torque supply device" according to the invention that is provided with an EPS motor as a DC brushless motor including a rotor (not shown in the figure) serving as a rotating component and having a permanent magnet attached thereto and a stator serving as a stationary component surrounding the rotor. The EPS motor is configured such that when an electric current is supplied to the stator of via the EPS drive device 500, the rotor is rotated under the action of the rotating magnetic field formed inside the EPS motor, thereby generating an EPS torque $T_{eps}$ as an example of the "steering torque" according to the invention in the rotation direction of the rotor.

A reduction gear (not shown in the figure) is fixed to the motor shaft serving as a rotating shaft of the EPS motor, and this reduction gear is also meshed with the pinion gear 14. Therefore, the EPS torque $T_{eps}$ generated from the EPS motor can function as a torque enhancing the rotation of the pinion gear 14. As mentioned hereinabove, the pinion gear 14 is coupled to the lower steering shaft 13, and the lower steering shaft 13 is coupled to the upper steering shaft 12 via the VGRS actuator 200. Therefore, during normal steering, the driver input torque MT applied to the upper steering shaft 12 is transmitted to the rack bar 15, while being appropriately assisted by the EPS torque $T_{eps}$ and the steering load on the driver is reduced.

The EPS drive device 500 is an electric drive circuit including a PWM circuit, a transistor circuit, and an inverter that is configured so that an electric current can be supplied to the stator of the EPS motor. The EPS drive device 500 is electrically connected to a battery (not shown in the figure) and configured such that a drive voltage can be supplied to the EPS motor by the electric power supplied from the battery. Further, the EPS drive device 500 is electrically connected to the ECU 100, and the operation of the drive device is controlled by the ECU 100. The EPS drive device 500 together with the EPS actuator 400 constitute an example of the "steering torque supply device" according to the invention.

The configuration of the "steering torque supply device" according to the invention is not limited to the example described above. For example, the EPS torque $T_{eps}$ outputted from the EPS motor may be transmitted directly to the lower steering shaft 13 with the reduction of rotation speed by a reduction gear (not shown in the figure). Alternatively, the EPS torque $T_{eps}$ may be applied as the power that assists the reciprocating movement of the tack bar 15. Thus, a specific configuration of the steering torque supply device according to the embodiment of the invention is not particularly limited, provided that the EPS torque $T_{eps}$ outputted from the EPS motor 400 can be supplied at least as part of the steering force that eventually turns the front wheels.

The ARS actuator 600 is another example of the "steering transmission ratio variation device" according to the invention which is provided with a power cylinder (not shown in the figure) and an actuator causing reciprocating movement of the power cylinder in the left-right direction, shown in the figure and in which the rear wheel steering angle $\delta_r$ that is a steering angle of rear wheels, which are the steered wheels, can be changed by causing rear steer rods 21 coupled to both ends of the power cylinder to slide through the predetermined distance in the left-right diction by the drive force applied from the actuator. The vehicle configuration in which the rear wheels can be steered is not limited to that shown in the figure and a variety of conventional forms thereof may be used.

A drive device (not shown in the figure) that drives the actuator of the ARS actuator 600 is electrically connected to the ECU 100 and configured so that the operation of the drive device is controlled by the ECU 100.

The vehicle 10 is provided with a variety of sensors including a torque sensor 16, a steering angle sensor 17, and a rotation angle sensor 18.

The torque sensor 16 is configured to be capable of detecting the driver input torque MT that is provided from the driver via the steering wheel 11. More specifically, the upper steering shaft 12 is divided into an upstream portion and a downstream portion and configured so that the two portions are coupled together by a torsion bar (not shown in the figure). Rings for rotation phase difference detection are provided at the upstream and downstream ends of the torsion bar. The torsion bar is configured such that when the driver of the vehicle 10 operates the steering wheel 11, torsion of the torsion bar in the rotation direction corresponds to the torque transmitted via the upstream portion of the upper steering shaft 12 (that is, the driver input torque MT), whereby the steering torque is transmitted downstream while the torsion torque is being produced. Therefore, a rotation phase difference is generated between the aforementioned rings for rotation phase difference detection when the steering torque is transmitted. The torque sensor 16 is configured to detect this rotation phase difference and be capable of converting the rotation phase difference into a torque value and outputting the torque value as an electric signal corresponding to the driver input torque MT. Further, the torque sensor 16 is electrically connected to the ECU 100 and configured so that the detected driver input torque MT can be referred to by the ECU 100 periodically or at random.

The steering angle sensor 17 is an angle sensor configured to be capable of detecting a steering angle $\theta_{MA}$ representing the rotation quantity of the upper steering shaft 12. The steering angle sensor 17 is electrically connected to the ECU 100 and configured so that the detected steering angle $\theta_{MA}$ can be referred to by the ECU 100 periodically or at random.

The rotation angle sensor 18 is a rotary encoder configured to be capable of detecting a relative rotation angle $\Delta\theta$ of the housing 201 (in terms of the rotation angle, the housing is identical to the upper steering shaft 12) and the lower steering shaft 13 in the VGRS actuator 200. The rotation angle sensor 18 is electrically connected to the ECU 100 and configured so that the detected relative rotation angle $\Delta\theta$ can be referred to by the ECU 100 periodically or at random.

The vehicle speed sensor 19 is a sensor configured to be capable of detecting a vehicle speed V that is the speed of the vehicle 10. The vehicle speed sensor 19 is electrically connected to the ECU 100 and configured so that the detected vehicle speed V can be referred to by the ECU 100 periodically or at random.

An onboard camera 20 is an image pick-up device that is disposed at the front end of the vehicle 10 and configured to be capable of picking up the image of a predetermined region in front of the vehicle 10. The onboard camera 20 is electrically connected to the ECU 100 and configured so that the picked up image of the region in front of the vehicle can be referred to, as image data, by the ECU 100 periodically or at random. The ECU 100 can analyze the image data and acquire various data necessary for the below-described LKA control.

Operation of the Embodiment

The operation of the embodiment will be described below with reference to the appropriate drawings.

Figure 2:
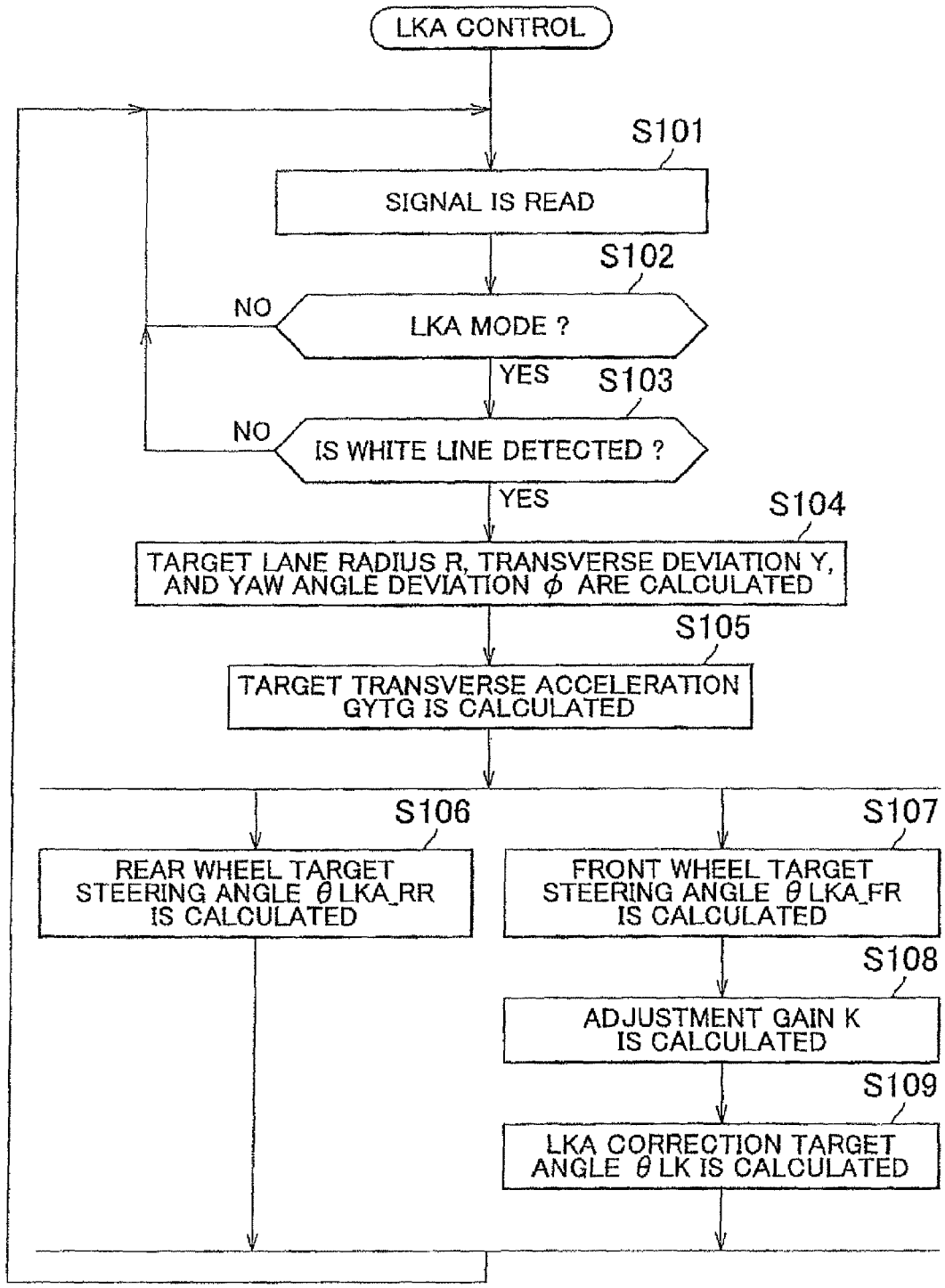
FIG. 2 is a flowchart of LKA control performed in the vehicle illustrated by FIG. 1.

First, the LKA control executed by the ECU 100 will be explained in greater detail with reference to FIG. 2. FIG. 2 is a flowchart of LKA control. The LKA control keeps the vehicle 10 within the target lane and is one of the travel assist functions of the vehicle 10.

Referring to FIG. 2, the ECU 100 reads various signals including operation signals of various switches provided in the vehicle 10, various flags, and sensor signals relating to the aforementioned sensors (step S101) and also determines whether or not a LKA mode has been selected in advance by the driver operating an operation button for LKA control start that is disposed in the cabin of the vehicle 10 (step S102). Where the LKA mode has not been selected (step S102: NO), the ECU 100 returns the processing to step S101.

Where the LKA mode has been selected (step S102: YES), the ECU 100 determines whether or not a white line (also may be a structure similar to the white line) specifying the target lane of LKA has been detected, on the basis of image data sent from the onboard camera 20 (step S103). Where the white line has not been detected (step S103: NO), the target lane cannot be specified and therefore the ECU 100 returns the processing to step S101. Where the white line has been detected (step S103: YES), the ECU 100 calculates road surface information of various kinds that is necessary to keep the vehicle 10 within the target lane (step S104).

A radius R of the target lane, a transverse deviation Y of the white line and the vehicle 10, and a yaw angle deviation $\phi$ of the white line and the vehicle 10 are calculated in step S104. Various modes including conventional image recognition algorithms can be used for calculating information necessary for control of this type that keeps the vehicle within the target lane.

Where the surface road information of various types has been calculated, the ECU 100 calculates a target transverse acceleration GYTG that is necessary for keeping the vehicle 10 within the target lane (step S105). The target transverse acceleration GYTG is an example of the "target state quantity" according to the invention. The target transverse acceleration GYTG also can be calculated according to conventional algorithms or computational formulas. Alternatively, a target transverse acceleration map including the above-mentioned lane radius R, transverse deviation Y, and yaw angle deviation $\phi$ may be stored in advance in a storage device such as ROM of the ECU 100 and the target transverse acceleration GYTG may be calculated by selecting the appropriate values from the table (the selection of this type is also a mode of calculation).

Where the target transverse acceleration GYTG has been calculated, the processing is branched into a rear wheel steering processing (step S106) and front wheel steering processing (steps S107 to S109).

First the rear wheel steering processing will be explained. In the rear wheel steering processing, a rear wheel target steering angle $\theta_{LKA\_RR}$ for LKA is calculated (step S106). The rear wheel target steering angle $\theta_{LKA\_RR}$ for LKA is a rear wheel steering angle corresponding value necessary for keeping the vehicle 10 within the target lane. For the reasons of control according to the embodiment, the rear wheel target steering angle $\theta_{LKA\_RR}$ for LKA is a value obtained by converting the rear wheel steering angle $\delta_r$ that is necessary when keeping the vehicle 10 within the target lane into a rotation angle of the lower steering shaft 13. The rear wheel target, steering angle $\theta_{LKA\_RR}$ for LKA is mapped in advance in the form associated with the target transverse acceleration GYTG and stored in the ROM. The calculated rear wheel target steering angle $\theta_{LKA\_RR}$ for LKA is stored in a writable storage device such as RAM.

Figure 3:
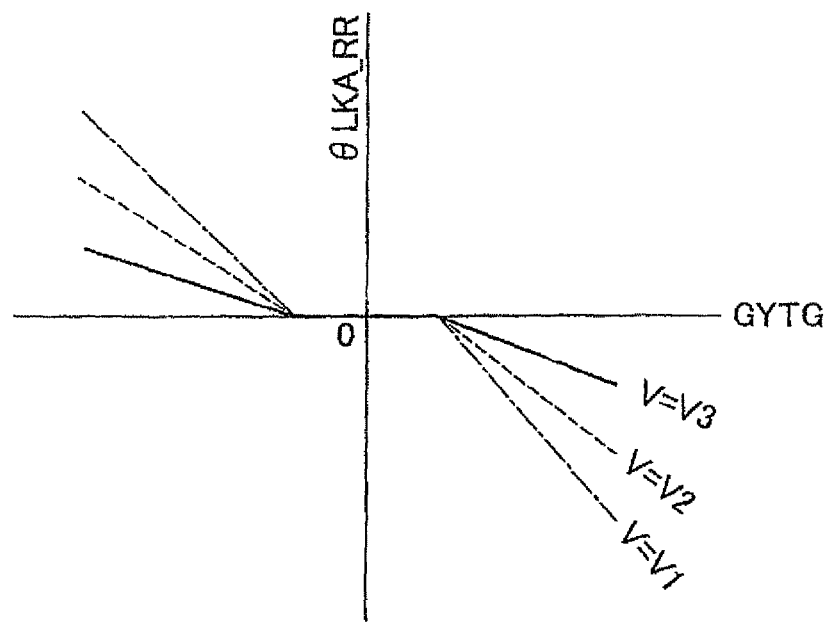
FIG. 3 is a diagram representing the relationship between the target transverse acceleration and the front wheel target steering angle for LKA.

The relationship between the target transverse acceleration GYTG and the rear wheel target steering angle $\theta_{LKA\_RR}$ for LKA will be explained herein with reference to FIG. 3. FIG. 3 shows the relationship between the target transverse acceleration GYTG and the rear wheel target steering angle $\theta_{LKA\_RR}$ for LKA.

In FIG. 3, the rear wheel target steering angle $\theta_{LKA\_RR}$ for LKA is plotted against the ordinate, and the target transverse acceleration GYTG is plotted against the abscissa. The region on the left side of the original point line corresponding to the target transverse acceleration GYTG=0 represents the target transverse acceleration corresponding to the direction to the left of the vehicle, and the region on the right side represents the transverse acceleration corresponding to the direction to the right of the vehicle. The region above the original point line corresponding to the rear wheel target steering angle $\theta_{LKA\_RR}$ for LKA being equal to zero corresponds to the steering angle in the direction to the right of the vehicle, and the region below the original point line corresponds to the steering angle in the direction to the left of the vehicle.

Therefore, the rear wheel target steering angle $\theta_{LKA\_RR}$ for LKA is a characteristic symmetrical with respect to the original point specifying the original point line. The absolute value of the rear wheel target steering angle $\theta_{LKA\_RR}$ for LKA increases linearly with respect to the target transverse acceleration GYTG with the exception of a non-sensitivity band close to the target transverse acceleration GYTG=0.

In FIG. 3, the characteristics of the rear wheel target steering angle $\theta_{LKA\_RR}$ for LKA with respect to vehicle speeds V of three kinds, namely, V=V1, V2 (V2>V1), and V3 (V3>V2) are represented by a dot line, a broken line, and a solid line, respectively, for example. These characteristics clearly show that the rear wheel target steering angle $\theta_{LKA\_RR}$ for LKA is set to lower values at higher vehicle speeds. This is because the degree of generated transverse acceleration increases with respect to the steering angle with the increase in the vehicle speed.

A control map, in which the relationship shown in FIG. 3 is represented in the form of numerical values (i.e., in which the relationship shown in FIG. 3 is quantified), has been stored in advance in the ROM of the ECU 100 (obviously, the vehicle speed V serving as a parameter value is represented more accurately), and the corresponding value is selected from the control map in step S106. Where step S106 has been executed, the processing is returned to step S101.

The front wheel steering processing will be explained below. In the front wheel steering processing, a front wheel target steering angle $\theta_{LKA\_FR}$ for LKA is calculated (step S107). The front wheel target steering angle $\theta_{LKA\_FR}$ for LKA is a front wheel steering angle corresponding value necessary to keep the vehicle 10 within the target lane.

For the reasons of control according to the embodiment, the front wheel target steering angle $\theta_{LKA\_FR}$ for LKA is a value obtained by converting the front wheel steering angle $\delta_f$ that is necessary to keep the vehicle 10 within the target lane into a rotation angle of the lower steering shaft 13. The front wheel target steering angle $\theta_{LKA\_FR}$ for LKA is mapped in advance in the form associated with the target transverse acceleration GYTG and stored in the ROM. The calculated front wheel target steering angle $\theta_{LKA\_FR}$ for LKA is stored in a writable storage device such as RAM.

Figure 4:
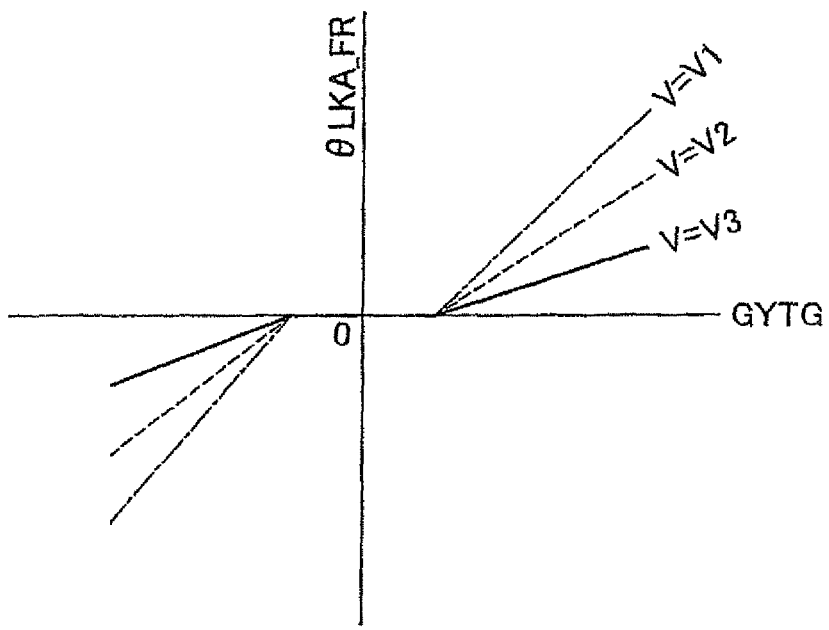
FIG. 4 is a diagram representing the relationship between the target transverse acceleration and the rear wheel target steering angle for LKA.

The relationship between the target transverse acceleration GYTG and the front wheel target steering angle $\theta_{LKA\_FR}$ for LKA will be explained herein with reference to FIG. 4. FIG. 4 shows the relationship between the target transverse acceleration GYTG and the front wheel target steering angle $\theta_{LKA\_FR}$ for LKA.

In FIG. 4, the front wheel target steering angle $\theta_{LKA\_FR}$ for LKA is plotted against the ordinate, and the target transverse acceleration GYTG is plotted against the abscissa. The region on the left side of the original point line corresponding to the target transverse acceleration GYTG=0 represents the target transverse acceleration corresponding to the direction to the left of the vehicle, and the region on the right side represents the transverse acceleration corresponding to the direction to the right of the vehicle. The region above the original point line corresponding to the front wheel target steering angle $\theta_{LKA\_FR}$ for LKA being equal to zero corresponds to the steering angle in the direction to the right of the vehicle, and the region below the original point line corresponds to the steering angle in the direction to the left of the vehicle.

Therefore, the front wheel target steering angle $\theta_{LKA\_FR}$ for LKA has a characteristic symmetrical with respect to the original point specifying the original point line. The absolute value of the front wheel target steering angle $\theta_{LKA\_FR}$ for LKA increases linearly with respect to the target transverse acceleration GYTG, with the exception of a non-sensitivity band close to the target transverse acceleration GYTG=0.

In FIG. 4, the characteristic of the front wheel target steering angle $\theta_{LKA\_FR}$ for LKA with respect to vehicle speeds V of three kinds, namely, V=V1, V2 (V2>V1), and V3 (V3>V2) are represented by a dot line, a broken line, and a solid line, respectively, for example. These characteristics clearly show that the front wheel target steering angle $\theta_{LKA\_FR}$ for LKA is set to lower values at higher vehicle speeds. This is because the degree of generated transverse acceleration increases with respect to the steering angle with the increase in the vehicle speed.

A control map an which the relationship shown in FIG. 4 is represented in the form of numerical values has been stored in advance in the ROM of the ECU 100 (obviously, the vehicle speed V serving as a parameter value is represented more accurately), and the corresponding value is selected from the control map in step S107.

Returning to FIG. 2, where the front wheel target steering angle $\theta_{LKA\_FR}$ for LKA, is calculated, the ECU 100 calculates an adjustment gain K (step S108) and also calculates a LKA correction target angle $\theta_{LK}$ by Eq. (1) below (step S109). The LKA correction target angle $\theta_{LK}$ means a relative rotation angle of the upper steering shaft 12 and the lower steering shaft 13 that should be generated by the VGRS actuator 200 as the LKA mode is executed (that is, during automatic steering for keeping the vehicle 10 within the target lane). The calculated LKA correction target angle $\theta_{LK}$ is temporarily stored in a writable storage device such as RAM.

$$\theta_{LK}=\theta_{LKA\_FR}\times K \tag{1}$$

The adjustment gain K is a gain for setting the steering angle $\theta_{MA}$ to an optimum value corresponding to the form of the target lane. This gain is mapped in association with the target lane radius R. The relationship between the adjustment gain K and the target lane radius R will be explained herein with reference to FIG. 5. Thus, FIG. 5 shows the relationship between the target lane radius R and the adjustment gain K.

Figure 5:
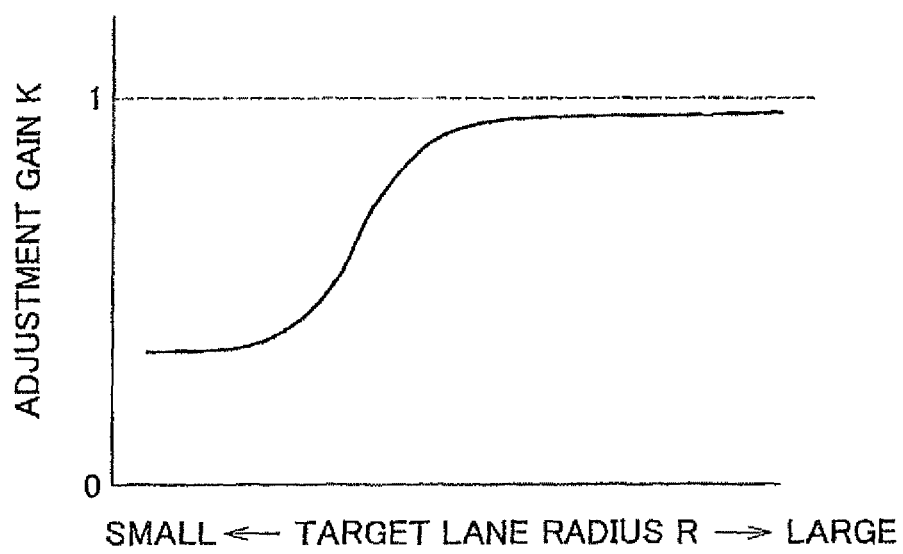
FIG. 5 represents the relationship between the lane radius R and the adjustment gain.

In FIG. 5, the adjustment gain K is plotted against the ordinate, and the target lane radius R is plotted against the abscissa. Thus, the degree of curving of the target lane increases (that is, the lane is a fast curve) with the transition to the left in the figure, and the target lane approaches a straight line with the transition to the right in the figure.

As shown in the figure, the adjustment gain K is set in a region less than 1 and also set to decrease with the decrease within the target lane radius R (that is, with the transition to a fast curve). This is because, a smaller target lane radius allows for larger rotation of the steering wheel 11. In other words, where the degree of rotation of the steering wheel 11 is small despite a small target lane radius, the possibility of making the driver uncomfortable increases.

In addition, when the adjustment gain K is "1", it means that all of the steering angle variations of the front wheels that are necessary to keep the vehicle within the target lane are given by the relative rotation of the upper steering shaft 12 and the lower steering shaft 13 created by the VGRS actuator 200 and also means that the steering wheel 11 is not rotated at all.

A map in which the relationship shown in FIG. 5 is represented by numerical values has been stored in advance in the ROM of the ECU 100, and the corresponding value is selected from the control map in step S108. Where step S109 has been executed, the processing is returned to step S101. The LKA control is executed in the above-described manner.

Meanwhile, the coordinated control of the VGRS actuator 200, EPS actuator 400, and ARS actuator 600 is necessary to keep the vehicle 10 within the target lane by the LKA control. In the embodiment, the front-rear wheel steering angle control and EPS control are executed by the ECU 100 in parallel with the LKA control, thereby realizing the aforementioned coordinated control.

Figure 6:
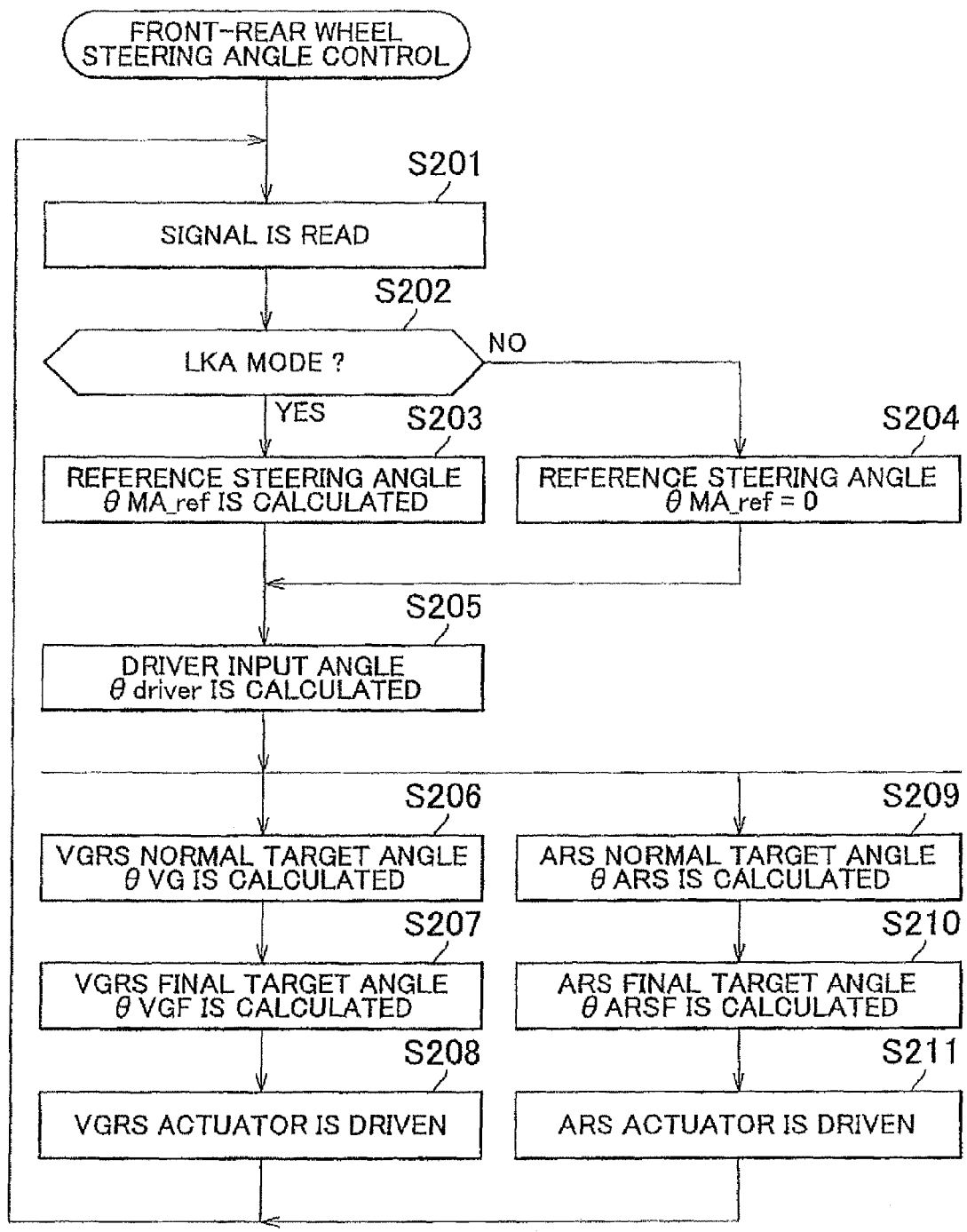
FIG. 6 is a flowchart of front-rear wheel steering angle control performed in the vehicle illustrated by FIG. 1.

The front-rear wheel steering angle control will be explained below in greater detail with reference to FIG. 6. FIG. 6 is a flowchart illustrating the front-rear wheel steering angle control.

Referring to FIG. 6, the ECU 100 reads data and sensor values necessary for the front-rear wheel steering angle control in the same manner as in steps S101 and S102 relating to the LKA control (step S201) and determines whether the LKA mode has been executed (step S202). In the front-rear wheel steering angle control, a reference steering angle $\theta_{MA\_ref}$ differs depending on whether the LKA mode has been executed.

The reference steering angle $\theta_{MA\_ref}$ as referred to herein is a steering angle corresponding to a reference position of the steering steel 11 that provides a reference for the driver's steering input. Therefore, when the LKA mode has not been executed (step S202: NO), that is, when the steering control is performed on the basis of the usual human steering input, the ECU 100 sets the reference steering angle $\theta_{MA\_ref}$ to zero (step S204).

Where the LKA has been executed (step S202: YES), the ECU 100 calculates a reference steering angle $\theta_{MA\_ref}$ by Eq. (2) below (step S203).

$$\theta_{MA\_ref} = \theta_{LKA\_FR} - \theta_{LK} \quad (2)$$

As shown in Eq. (2), the reference steering angle $\theta_{MA\_ref}$ during execution of the LKA mode is the difference between the front wheel target steering angle $\theta_{LKA\_FR}$ for LKA and the LKA correction target angle $\theta_{LK}$, and this difference is zero when the aforementioned adjustment gain K is 1. Thus, as the LKA mode is executed, the steering angle generated by the LKA mode, which is the automatic steering control, is taken at the reference position of driver input.

Where the reference steering angle $\theta_{MA\_ref}$ has been set, a driver input angle $\theta_{driver}$ is calculated by the ECU 100 according to Eq. (3) below (step S205).

$$\theta_{driver} = \theta_{MA} - \theta_{MA\_ref} \quad (3)$$

As shown in Eq. (3) above, the driver input angle $\theta_{driver}$ is a steering angle corresponding to the steering input provided by the driver on the basis of his/her own steering intentions and is an example of the "driver steering input" and "driver input angle" in accordance with the invention. Where the driver input angle $\theta_{driver}$ has been calculated, the processing is branched into a front wheel steering processing including step S206 to step S208 and a rear wheel steering processing including step S209 to step S211.

In the front wheel steering processing, the ECU 100 calculates a VGRS normal target angle $\theta_{VG}$ by Eq. (4) below (step S206).

$$\theta_{VG} = K1 \times \theta_{driver} \quad (4)$$

Figure 7:
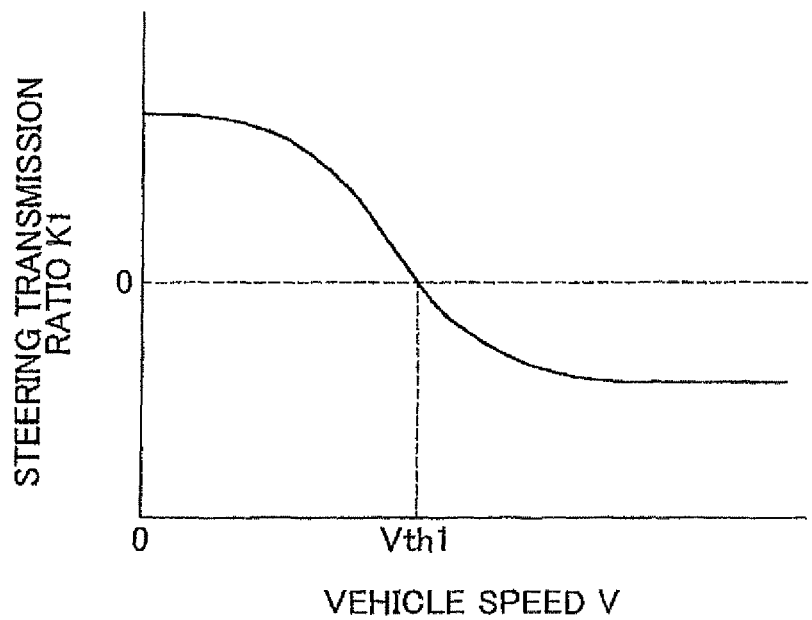
FIG. 7 represents the relationship between the front wheel steering transmission ratio and the vehicle speed.

In Eq. (4), K1 is a front wheel steering transmission ratio specifying the rotation angle of the lower steering shaft 13 with respect to the driver input angle $\theta_{driver}$ (that is, primarily the rotation angle of the upper steering shaft 12); this ratio is a numerical value that changes in response to the vehicle speed V. The relationship between the front wheel steering transmission ratio K1 and the vehicle speed V will be explained below with reference to FIG. 7. FIG. 7 illustrates the relationship between the front wheel steering transmission ratio K1 and the vehicle speed V.

In FIG. 7, the front wheel steering transmission ratio K1 is 0 at a vehicle speed $V_{th1}$ belonging to a medium vehicle speed range (it means that the rotation ratio of the upper steering shaft 12 and the lower steering shaft 13 is 1:1), larger than 0 at a vehicle speed lower than $V_{th1}$, and less than 0 at a vehicle speed higher than $V_{th1}$. Thus, in this configuration, the variation quantity of the front wheel steering angle with respect to the driver input angle increases at a lower vehicle speed. This is because, as has been mentioned hereinabove, the transverse acceleration related to the steering angle increases at a higher vehicle speed.

Returning to FIG. 6, where the VGRS normal target angle $\theta_{VG}$ is calculated, the ECU 100 calculates a VGRS final target angle $\theta_{VGF}$ by Eq. (5) below (step S207).

$$\theta_{VGF} = \theta_{LK} + \theta_{VG} \quad (5)$$

As clearly follows from Eq. (5) above, the VGRS final target angle $\theta_{VGF}$ is a sum total value of the front wheel steering angle control quantity (that is, the relative rotation quantity of the lower steering shaft 13 with respect to the upper steering shaft 12) for the LKA mode (that is, for keeping the target lane) and the front wheel steering control quantity of driver steering.

Where the VGRS final target angle $\theta_{VGF}$ has been calculated, the ECU 100 controls the VGRS actuator 200 by controlling the VGRS drive device 300 so as to obtain the calculated VGRS final target angle $\theta_{VGF}$ (step S208). Where the drive control of the VGRS actuator 200 has been performed, the processing is returned to step S201.

In the rear wheel steering processing, the ECU 100 calculates an ARS normal target angle $\theta_{ARS}$ by Eq. (6) below (step S209).

$$\theta_{ARS} = K2 \times \theta_{driver} \quad (6)$$

Figure 8:
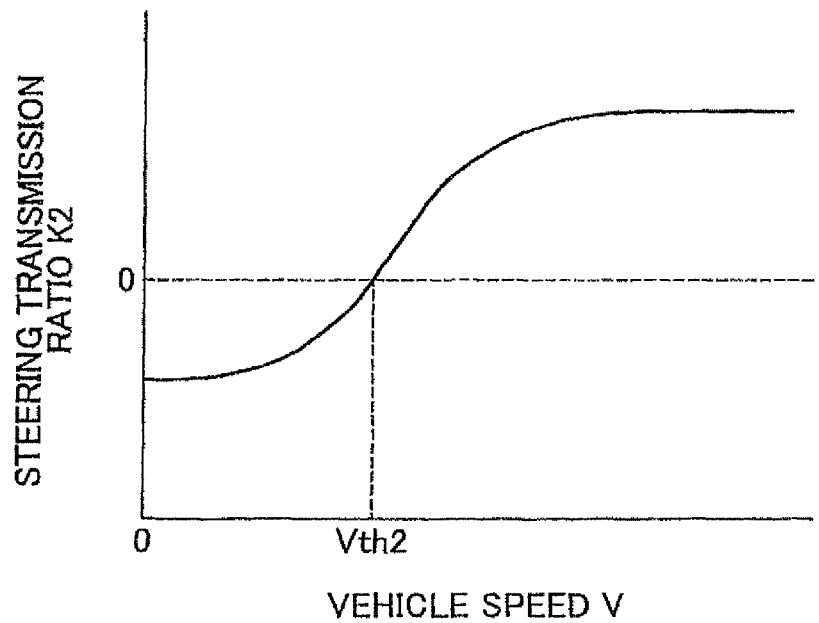
FIG. 8 represents the relationship between the rear wheel steering transmission ratio and the vehicle speed.

In Eq. (6), K2 is a rear wheel steering transmission ratio specifying the rear wheel steering angle $\delta_r$ with respect to the driver input angle $\theta_{driver}$; this ratio is a numerical value that changes in response to the vehicle speed V. The relationship between the rear wheel steering transmission ratio K2 and the vehicle speed V will be explained below with reference to FIG. 8. FIG. 8 illustrates the relationship between the rear wheel steering transmission ratio K2 and the vehicle speed V.

In FIG. 8, the rear wheel steering transmission ratio K2 is 0 at a vehicle speed $V_{th2}$ belonging to a medium vehicle speed range, aid rear wheel steering angle $\delta_r$ becomes 0.

Further, K2<0 at a vehicle speed lower than $V_{th2}$. In this region, the rear wheel steering angle $\delta_r$ and the driver input angle are in the opposite directions (that is, have opposite phases).

Further, K2>0 at a vehicle speed higher than $V_{th2}$. In this region, the rear wheel steering angle $\delta_r$ and the driver input angle are in the same directions (that is, have the same phase).

Returning to FIG. 6, where the ARS normal target angle $\theta_{ARS}$ is calculated, the ECU 100 calculates a ARS final target angle $\theta_{ARSF}$ by Eq. (7) below (step S210).

$$\theta_{ARSF} = \theta_{LKA\_RR} + \theta_{ARS} \quad (7)$$

As clearly follows from Eq. (7) above, the ARS final target angle $\theta_{ARSF}$ is a sum total value of the rear wheel steering angle control quantity for the LKA mode (that is, for keeping the target lane) and the rear wheel steering control quantity of driver steering.

Where the ARS final target angle $\theta_{ARSF}$ has been calculated, the ECU 100 controls the ARS actuator 600 so as to obtain the calculated ARS final target angle $\theta_{ARSF}$ (step S211). Where the drive control of the ARS actuator 200 is performed, the processing is returned to step S201. The front-rear wheel steering angle control is executed in the above-described manner.

Figure 9:
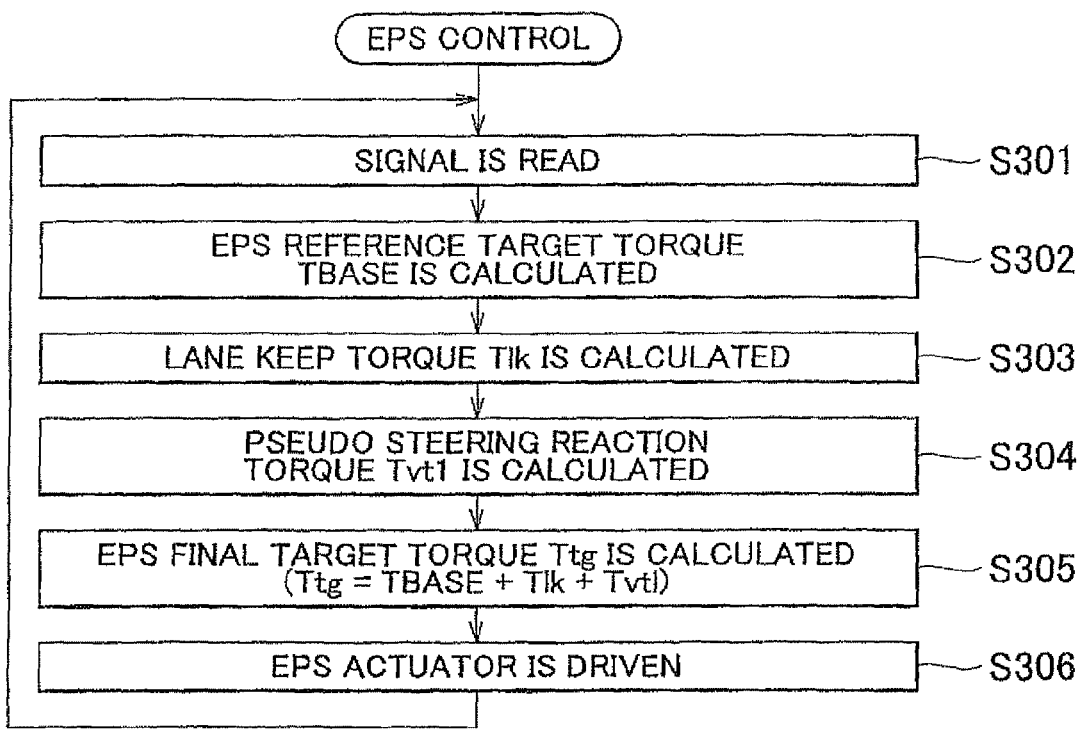
FIG. 9 is a flowchart of EPS control performed in the vehicle illustrated by FIG. 1.

The EPS control will be explained below with reference to FIG. 9. FIG. 9 is a flowchart of EPS control.

Referring to FIG. 9, the ECU 100 reads various signals necessary for the EPS control (step S301) and calculates an EPS reference target torque TBASE that is a base value of the EPS torque $T_{eps}$ that should be outputted from the EPS motor of the EPS actuator 400 (step S302).

Figure 10:
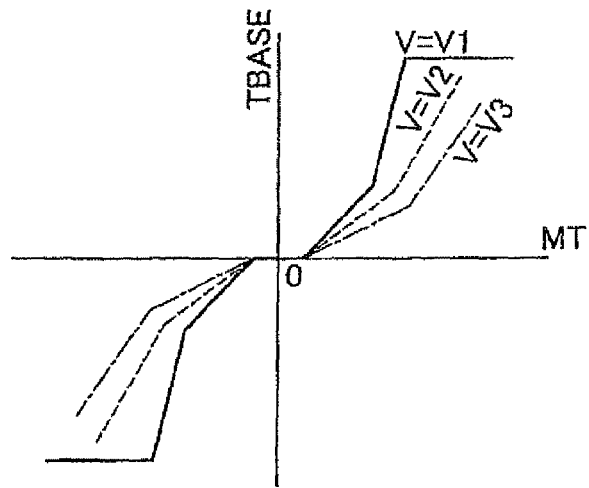
FIG. 10 shows the relationship between the EPS reference target torque and the driver input torque.

The relationship between the EPS reference target torque TBASE and the drive input torque MT will be explained herein with reference to FIG. 10. FIG. 10 shows the relationship between the EPS reference target torque TBASE and the drive input torque MT.

In FIG. 10, the EPS reference target torque TBASE is plotted against the ordinate, and the drive input torque MT is plotted against the abscissa. The region to the left of the original point line corresponding to the drive input torque MT=0 corresponds to a steering operation to the left of the vehicle, and the region to right of the original point line corresponds to a steering operation to the right of the vehicle. Therefore, the EPS reference target torque TBASE in the figure has a symmetrical characteristic with respect to the original point line.

In FIG. 10, the characteristics of the EPS reference target torque TBASE with respect to vehicle speeds V of three kinds, namely, V=V1, V2 (V2>V1), and V3 (V3>V2) are represented by a solid line, a broken line, and a dot line, respectively, for example. This figure clearly shows that the EPS reference target torque TBASE is set to lower values at higher vehicle speeds. This is because the steering angle for obtaining the necessary transverse acceleration decreases with the increase in the vehicle speed. The excess operation of the driver can be prevented and the behavior of the vehicle 10 can be stabilized by increasing a force required for steering of the steering wheel 11 at a high vehicle speed (that is, in the so-called heavy handling state).

A control map in which the relationship shown in FIG. 10 is represented in the form of numerical values has been stored in advance in the ROM of the ECU 100 (obviously, the vehicle speed V serving as a parameter value is represented more accurately), and the corresponding value is selected from the control map in step S302.

Returning to FIG. 9, where the EPS reference target torque TBASE is calculated; the ECU 100 calculates a lane keep torque Tlk (step S303).

The lane keep torque Tlk is a steering torque that is supplied to cancel the steering reaction torque, which is generated when automatic steering is performed in the LKA mode to keep the vehicle within the target lane, and to stabilize the vehicle behavior.

By contrast with the EPS actuator 400, the VGRS actuator 200 is disposed in a coupling side of the upper steering shaft 12 and lower steering shaft 13 and is not fixed to the vehicle 10. Therefore, where the steering angle control corresponding to the abovementioned LKA correction target angle $\theta_{LK}$ is performed in a hands-free state in which the driver does not maintain the steering of the steering wheel 11, the steering wheel 11 is steered in the direction opposite that of the steering angle direction that is the original target direction, instead of changing the steering angle of the steered wheels, by the steering device including the rack-and-pinion steering mechanism, lower steering shaft 13, and upper steering shaft, the EPS actuator 400, and also the steering reaction torque generated in the front and rear wheels, which are the steered wheels. Alternatively, where steering of the steering wheel 11 is maintained, the driver experiences an uncomfortable feel as if the steering wheel 11 is steered in the direction opposite the turning direction of the vehicle 10 by the reaction torque.

The lane keep torque Tlk is an example of the "steering reaction restriction torque" according to the invention that cancels such steering reaction torque. The lane keep torque Tlk is calculated by a lane keep torque calculation processing.

Figure 11:
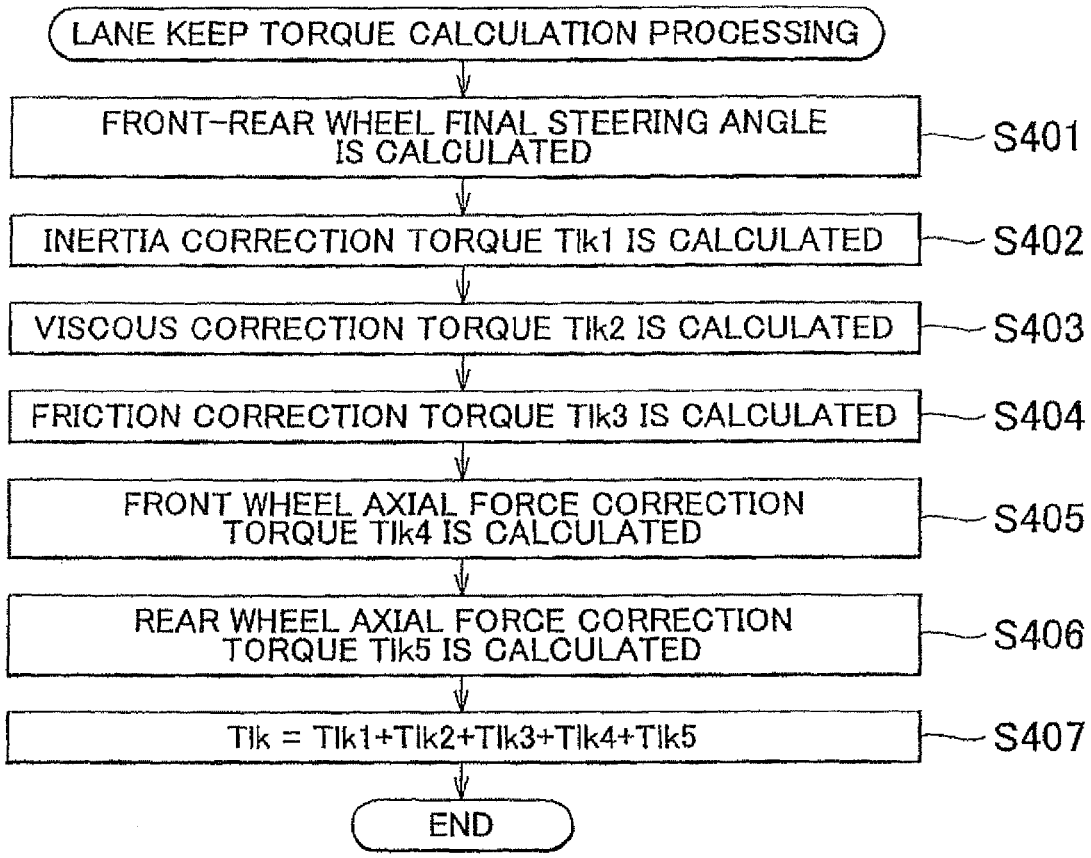
FIG. 11 is a flowchart of lane keep torque calculation processing executed in the EPS control illustrated by FIG. 9.

The lane keep torque calculation processing will be explained herein with reference to FIG. 11. FIG. 11 is a flowchart of the lane keep torque calculation processing.

First, the ECU 100 calculates a front wheel final steering angle $\theta_{FR\_Final}$ and a rear wheel final steering angle $\theta_{RR\_Final}$ (step S401).

The front wheel final steering angle $\theta_{FR\_Final}$ is calculated by Eq. (8) below.

$$\theta_{FR\_Final} = \theta_{MA} + \theta_{VG} + \theta_{LK} \quad (8)$$

Thus, the front wheel final steering angle $\theta_{FR\_Final}$ is a final rotation angle of the lower steering shaft 13 to which the steering input of the driver is added and represents a value uniquely corresponding to the final steering angle of the front wheels when the LKA mode is executed.

Eq. (8) above may be also represented in the form of Eq. (8') below.

$$\theta_{FR\_Final} = \theta_{LKA\_FR} + \theta_{VG} + \theta_{driver} \quad (8')$$

The rear wheel final steering angle $\theta_{RR\_Final}$ is calculated by Eq. (9) below.

$$\theta_{RR\_Final} = \theta_{LKA\_RR} + \theta_{ARS} \quad (9)$$

Thus, the rear wheel final steering angle $\theta_{RR\_Final}$ is a value corresponding to a final steering angle of the rear wheels to which the steering input of the driver is added when the LKA mode is executed.

Where the final steering angles of the front and rear wheels have been calculated, the ECU 100 calculates an inertia correction torque Tlk1 on the basis of a front wheel final steering angle acceleration $\theta_{FR\_Final}''$, which is the second order derivative (or the second order differential) of the front wheel final steering angle $\theta_{FR\_Final}$ with respect to time (step S402). The inertia correction torque Tlk1 is a torque for canceling the steering reaction torques caused by the inertia resistance of the steering device coupled to the front wheels (steering device including the steering wheel 11, upper steering shaft 12, lower steering shaft 13, and rack-and-pinion mechanism) and the EPS actuator 400 (which are examples of the "first steering reaction torque" and "second steering reaction torque" according to the invention).

The relationship between the inertia correction torque Tlk1 and the front wheel final steering angle acceleration $\theta_{FR\_Final}''$ will be explained herein with reference to FIG. 12. Here, FIG. 12 illustrates the relationship between the inertia correction torque Tlk1 and the front wheel final steering angle acceleration $\theta_{FR\_Final}''$.

Figure 12:
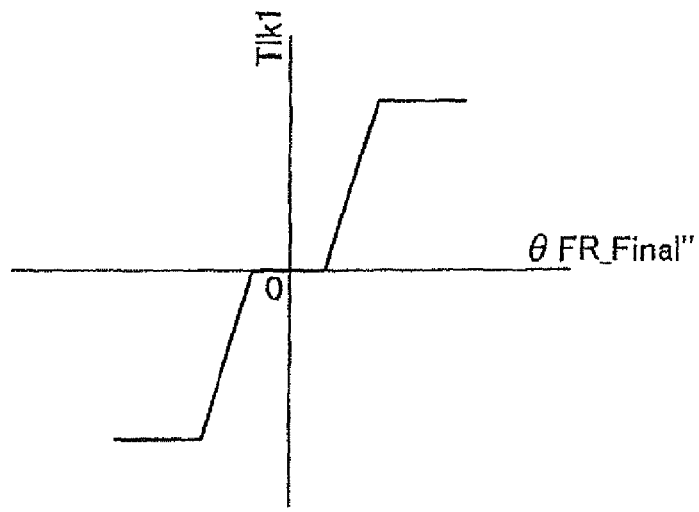
FIG. 12 represents the relationship between the inertia correction torque and the front wheel final steering angle acceleration.

In FIG. 12, the inertia correction torque Tlk1 is plotted against the ordinate and the front wheel final steering angle acceleration $\theta_{FR\_Final}''$ is plotted against the abscissa (the symbol ["] means the derivative). As shown in the figure, the inertia correction torque Tlk1 has a point-symmetrical characteristic with respect to the original point during right turn and left turn, and the absolute value of the inertia correction torque increases linearly with the increase in $\theta_{FR\_Final}''$, with the exception of a non-sensitivity region close to $\theta_{FR\_Final}''=0$ and a saturation region.

Then, the ECU 100 calculates a viscous correction torque Tlk2 on the basis of the front wheel final steering angle speed $\theta_{FR\_Final}'$, which is a first order derivative of the front wheel final steering angle $\theta_{FR\_Final}$ with respect to time (step S403). The viscous correction torque Tlk2 is a torque for canceling the steering reaction torques caused by viscous resistance of the steering device coupled to the front wheels (steering device including the steering wheel 11, upper steering shaft 12, lower steering shaft 13, and rack-and-pinion mechanism) and the EPS actuator 400 (which are examples of the "first steering reaction torque" and "second steering reaction torque" according to the invention).

The relationship between the viscous correction torque Tlk2 and the front wheel final steering angle speed $\theta_{FR\_Final}'$ will be explained herein with reference to FIG. 13. Here, FIG. 13 illustrates the relationship between the viscous correction torque Tlk2 and the front wheel final steering angle speed $\theta_{FR\_Final}'$.

Figure 13:
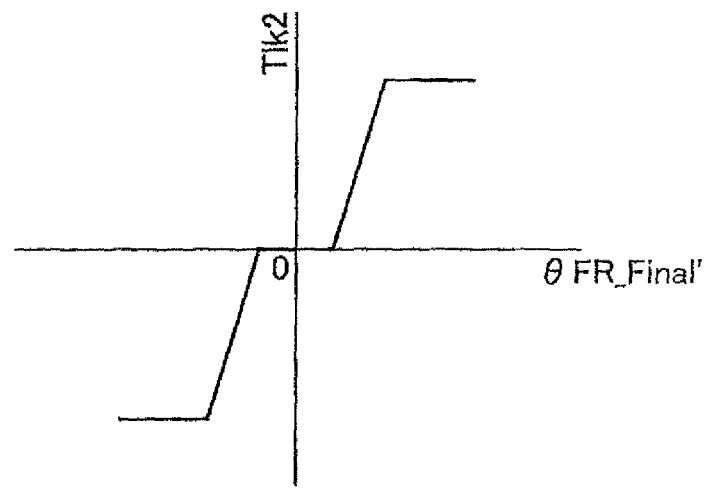
FIG. 13 represents the relationship between the viscous correction torque and the front wheel final steering angle speed.

In FIG. 13, the viscous correction torque Tlk2 is plotted against the ordinate and the front wheel final steering angle speed $\theta_{FR\_Final}'$ is plotted against the abscissa. As shown in the figure, the viscous correction torque Tlk2 has a point-symmetrical characteristic with respect to the original point during right turn and left turn, and the absolute value of the viscous correction torque increases linearly with the increase in $\theta_{FR\_Final}'$, with the exception of a non-sensitivity region close to $\theta_{FR\_Final}'=0$ and a saturation region.

Then, the ECU 100 calculates a friction correction torque Tlk3 on the basis of the front wheel final steering angle speed $\theta_{FR\_Final}'$, which is a first order derivative of the front wheel final steering angle $\theta_{FR\_Final}$ with respect to time (step S404). The friction correction torque Tlk3 is a torque for canceling the steering reaction torques caused by friction resistance of the steering device coupled to the front wheels (steering device including the steering wheel 11, upper steering shaft 12, lower steering shaft 13, and rack-and-pinion mechanism) and the EPS actuator 400 (which are examples of the "first steering reaction torque" and "second steering reaction torque" according to the invention).

The relationship between the friction correction torque Tlk3 and the front wheel final steering angle speed $\theta_{FR\_Final}'$ will be explained herein with reference to FIG. 14. Here, FIG. 14 illustrates the relationship between the friction correction torque Tlk3 and the front wheel final steering angle speed $\theta_{FR\_Final}'$.

Figure 14:
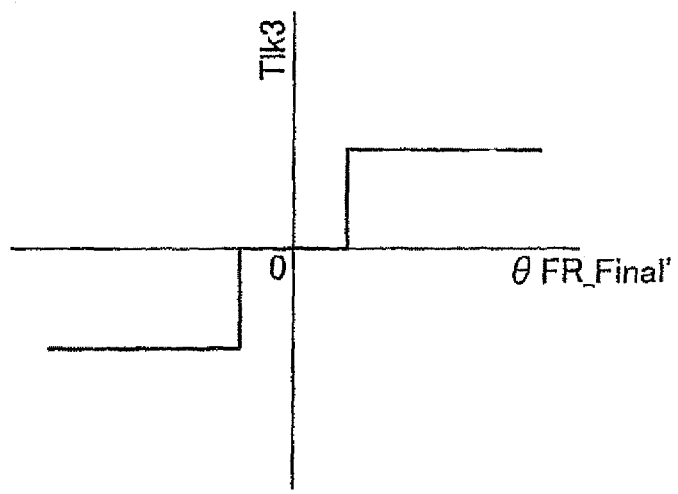
FIG. 14 represents the relationship between the friction correction torque and the front wheel final steering angle speed.

In FIG. 14, the friction correction torque Tlk3 is plotted against the ordinate and the front wheel final steering angle speed $\theta_{FR\_Final}'$ is plotted against the abscissa. As shown in the figure, the friction correction torque Tlk3 has a point-symmetrical characteristic with respect to the original point during right turn and left turn, and the value of the friction correction torque is switched between two values according to the positive/negative sign of $\theta_{FR\_Final}'$, with the exception of a non-sensitivity region close to $\theta_{FR\_Final}'=0$.

Then, the ECU 100 calculates a front wheel axial force correction torque Tlk4 on the basis of the front wheel final steering angle frequency response value $s\theta_{FR\_Final}$ obtained by multiplying the front wheel final steering angle $\theta_{FR\_Final}$ by the frequency response term S1 represented by Eq. (10) below (step S405). The front wheel axial force correction torque Tlk4 is a torque for canceling the steering reaction torque corresponding to the self-aligning torque generated about a kingpin axis of the front wheels (this torque is an example of the "third steering reaction torque").

$$S1=(a_2s^2+a_1s+a_0)/(b_2s^2+b_1s+b_0) \tag{10}$$

In Eq. (10) above, "s" is a Laplace operand and $a_2$, $a_1$, $a_0$, $b_2$, $b_1$, and $b_0$ are coefficients.

The stationary relationship between the front wheel axial force correction torque Tlk4 and the front wheel final steering angle $\theta_{FR\_Final}$ will be explained herein with reference to FIG. 15. Here, FIG. 15 illustrates the stationary relationship between the front wheel axial force correction torque Tlk4 and the front wheel final steering angle $\theta_{FR\_Final}$.

Figure 15:
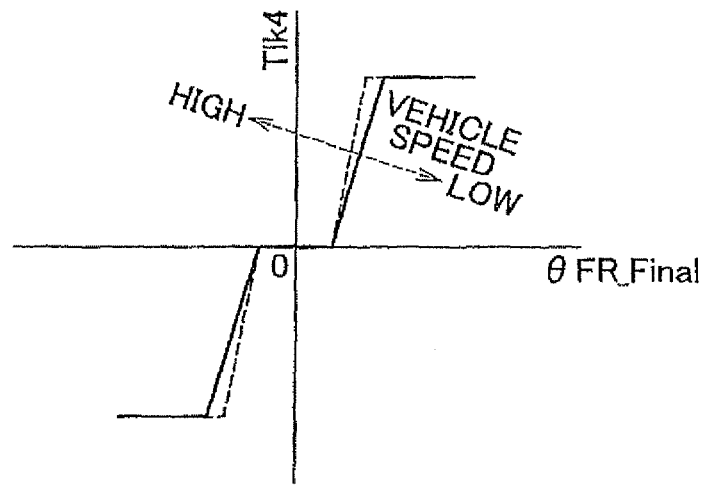
FIG. 15 represents the normal relationship between the front wheel axial force correction torque and the front wheel final steering angle.

In FIG. 15, the front wheel axial force correction torque Tlk4 is plotted against the ordinate and the front wheel final steering angle speed $\theta_{FR\_Final}$ is plotted against the abscissa.

As shown in the figure, the front wheel axial force correction torque Tlk4 has a point-symmetrical characteristic with respect to the original point during right turn and left turn and the absolute value of the front wheel axial force correction torque Tlk4 increases linearly with the increase in $\theta_{FR\_Final}$, with the exception of a non-sensitivity region close to $\theta_{FR\_Final}=0$ and a saturation region.

Further, the front wheel axial force correction torque Tlk4 is provided with a characteristic versus the vehicle speed V such that the inclination relating to the increase in absolute value is larger on the high vehicle speed side (see a broken line) than on the low vehicle speed side (see a solid line).

Then, the ECU 100 calculates a rear wheel axial force correction torque Tlk5 on the basis of the rear wheel final steering angle frequency response value $s\theta_{RR\_Final}$ obtained by multiplying the rear wheel final steering angle $\theta_{RR\_Final}$ by the frequency response term S2 represented by Eq. (11) below (step S406). The rear wheel axial force correction torque Tlk5 is a torque for canceling the steering reaction torque corresponding to the self-aligning torque generated about a kingpin axis of the rear wheels (this torque is an example of the "third steering reaction torque").

$$S2=(c_1s+c_0)/(b_2s^2+b_1s+b_0) \tag{11}$$

In Eq. (11) above, "s" is a Laplace operand and $c_1$, $c_0$, $b_2$, $b_1$, and $b_0$ are coefficients.

The stationary relationship between the rear wheel axial force correction torque Tlk5 and the front wheel final steering angle $\theta_{RR\_Final}$ will be explained herein with reference to FIG. 16. Here, FIG. 16 illustrates the stationary relationship between the rear wheel axial force correction torque Tlk5 and the front wheel final steering angle $\theta_{RR\_Final}$.

Figure 16:
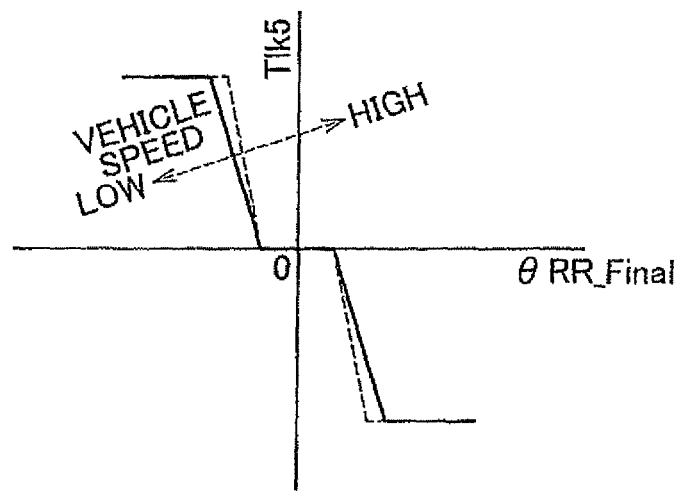
FIG. 16 represents the normal relationship between the rear wheel axial force correction torque and the rear wheel final steering angle.

In FIG. 16, the rear wheel axial force correction torque Tlk3 is plotted against the ordinate and the front wheel final steering angle speed $\theta_{RR\_Final}$ is plotted against the abscissa. As shown in the figure, the rear wheel axial force correction torque Tlk5 has a point-symmetrical characteristic with respect to the original point during right turn and left turn and the absolute value thereof increases linearly with the increase in $\theta_{RR\_Final}$, with the exception of a non-sensitivity region close to $\theta_{RR\_Final}=0$ and a saturation region.

Further, the rear wheel axial force correction torque Tlk5 is provided with a characteristic for the vehicle speed V such that the inclination relating to the increase in absolute value is larger on the high vehicle speed side (see a broken line) than on the low vehicle speed side (see a solid line).

Then, the ECU 100 calculates a lane keep torque Tlk by Eq. (12) below (step S407).

$$Tlk=Tlk1+Tlk2+Tlk3+Tlk4+Tlk5 \tag{12}$$

As clearly follows from Eq. (12) above, the lane keep torque Tlk is a sum total value of torques (Tlk1, Tlk2, and Tlk3) that cancel the steering reaction torques caused by physical properties (inertia resistance, viscous resistance, and friction resistance) of the steering device and EPS actuator 400 and the torques (Tlk4 and Tlk5) that cancel the steering reaction torques caused by the axial force of the steered wheels. Where the lane keep torque Tlk has been calculated, the lane keep torque calculation procedure ends.

Returning to FIG. 9, where the lane keep torque Tlk has been calculated, the ECU 100 calculates a pseudo steering reaction torque Tvtl (step S304). The pseudo steering reaction torque Tvtl is a torque for imparting the desired characteristic to the steering feel of the steering wheel 11 and calculated by Eq. (13) below.

$$Tvtl=Tvtl1+Tvtl2 \tag{13}$$

In Eq. (13) above, Tvtl1 is a pseudo steering reaction torque characteristic term that is set on the basis of the driver input angle $\theta_{driver}$ and the vehicle speed V, and Tvtl2 is a pseudo steering reaction torque characteristic term that is set on the basis of the driver input angle speed $\theta_{driver}$ and the vehicle speed V.

Figure 17:
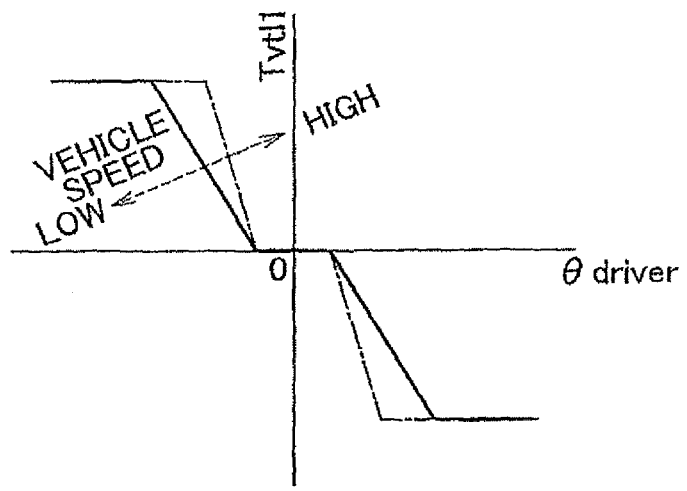
FIG. 17 represents the relationship between the drive input angle and the pseudo steering reaction torque characteristic term.

Here, the pseudo steering reaction torque characteristic term Tvtl1 will be explained with reference to FIG. 17. FIG. 17 shows the relationship between the driver input angle $\theta_{driver}$ and the pseudo steering reaction torque characteristic term Tvtl1.

In FIG. 17, the pseudo steering reaction torque characteristic term Tvtl1 is plotted against the ordinate and the driver input angle $\theta_{driver}$ is plotted against the abscissa. As shown in the figure, the pseudo steering reaction torque characteristic term Tvtl1 has a point-symmetrical characteristic with respect to the original point during right turn and left turn and the absolute value of the pseudo steering reaction torque characteristic term Tvtl1 increases linearly with the increase in $\theta_{driver}$, with the exception of a non-sensitivity region close to $\theta_{driver}=0$ and a saturation region.

Further, the pseudo steering reaction torque characteristic term Tvtl1 is provided with a characteristic for the vehicle speed V such that the inclination relating to the increase in absolute value is larger on the high vehicle speed side (see a broken line) than on the low vehicle speed side (see a solid line).

Figure 18:
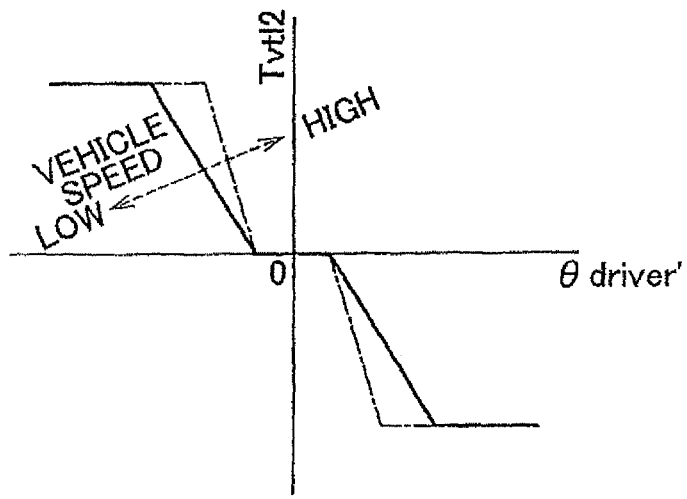
FIG. 18 represents the relationship between the drive input angle speed and the pseudo steering reaction torque characteristic term.

Here, the pseudo steering reaction torque characteristic term Tvtl2 will be explained with reference to FIG. 18. FIG. 18 shows the relationship between the driver input angle speed $\theta_{driver}'$ and the pseudo steering reaction torque characteristic term Tvtl2.

In FIG. 18, the pseudo steering reaction torque characteristic term Tvtl2 is plotted against the ordinate and the driver input angle speed $\theta_{drive}'$ is plotted against the abscissa. As shown in the figure, the pseudo steering reaction torque characteristic term Tvtl2 has a point-symmetrical characteristic with respect to the original point during right turn and left turn and the absolute value of the pseudo steering reaction torque characteristic term Tvtl2 increases linearly with the increase in $\theta_{driver}'$ with the exception of a non-sensitivity region close to $\theta_{driver}'=0$ and a saturation region. Further, the gain characteristic term is provided with a characteristic for the vehicle speed V such that the inclination relating to the increase in absolute value is larger on the high vehicle speed side (see a broken line) than on the low vehicle speed side (see a solid line).

Returning to FIG. 9, where the pseudo steering reaction torque characteristic term Tvtl1 has been calculated, the ECU 100 calculates an EPS final target torque Ttg by Eq. (14) below. The EPS final target torque Ttg is a target value of the EPS torque Teps that should be finally supplied from the EPS actuator 400.

$$Ttg = TBASE + Tlk + Tvt1 \quad (14)$$

Where the EPS final target torque Ttg has been calculated, the ECU 100 drive controls the EPS actuator 400 so that the EPS torque Teps becomes the EPS final target torque Ttg (step S306). Where the EPS actuator 400 has been drive controlled, the processing is returned to step S301 and the series of processing operations is repeated. The EPS control is performed in the above-described manner.

As described hereinabove, in the embodiment, the vehicle 10 can be advantageously kept within the target lane within the execution period of the LKA mode based on the LKA control and also the front-rear wheel steering angle control and EPS control associated with the LKA control.

In this case, the LKA correction target angle $\theta_{LK}$, which is a relative rotation angle of the lower steering shaft 13 rotated by the VGRS actuator 200, is less; by a quantity corresponding to the adjustment gain K, than the front wheel target steering angle $\theta_{LKA\_FR}$ for LKA corresponding to the front wheel steering angle (in the embodiment, the rotation angle of the lower steering shaft 13) necessary to keep the vehicle within the target lane, but the remaining steering angle variation is provided by the lane keep torque Tlk supplied from the EPS actuator 400.

Thus, the process for calculating the inertia correction torque Tlk1, viscous correction torque Tlk2, friction correction torque Tlk3, and front wheel axial force correction torque Tlk4 in the lane keep torque calculation processing is performed by using the front wheel target steering angle $\theta_{LKA\_FR}$ for LKA as an input angle, and these torques match the steering reaction torque in the case in which the steering angle variation of front wheels has occurred that corresponds to the front wheel target steering angle $\theta_{LKA\_FR}$ for LKA. Therefore, the lane keep torque Tlk assumes a form such as to rotate the upper steering shaft 12 correspondingly to the steering angle variation that is not covered by the relative rotation of the lower steering shaft 13. As a result, automatic control of steering angle corresponding to the reference steering angle $\theta_{MA\_ref}$ is realized.

The reference steering angle $\theta_{MA\_ref}$ is an optimum steering angle (steering angle that does not make the driver uncomfortable) corresponding to the target lane and specified by the adjustment gain K. Thus, according to the embodiment, the vehicle 10 can be advantageously kept within the target lane, while realizing the optimum steering angle, by cooperation of the VGRS actuator 200 and the EPS actuator 400. Where the adjustment gain K is 1, the entire steering angle variation of the front wheels that is required to keep the vehicle within the target lane is provided by the relative rotation of the lower steering shaft 13. In any case, this is an example of operation of the first control unit according to the embodiment of the invention that "controls the steering transmission ratio variation device so that the state quantity of the vehicle becomes the present target state quantity".

When the input angle relating to the lane keep torque calculation processing is only the front wheel target steering angle $\theta_{LKA\_FR}$ for LKA and the rear wheel target steering angle $\theta_{LKA\_RR}$ for LKA, that is, when the lane keep torque Tlk is a torque that cancels only the steering reaction torque generated by automatic steering, the lane keep torque Tlk interferes with the override operation of the driver (that is, the steering input of the driver).

Thus, because the effect produced by the variation of steering angle of the front and rear wheels generated by the override operation on the steering reaction torque is not taken into account, the steering feel is degraded because the steering becomes excessively heavy, the steering becomes excessively light, or the steering load changes excessively, regardless of whether the override operation is accompanied by a constant driver input angle speed or driver input torque. This effect becomes particularly significant with respect to the friction correction torque Tlk3 which is switched between two values correspondingly to the steering direction (correspondingly to the positive/negative sign of steering angle speed).

To resolve this problem, in the embodiment, the driver input angle $\theta_{driver}$ corresponding to the steering angle generated by the override operation and the VGRS normal target angle $\theta_{VG}$ which is the relative rotation quantity of the lower steering shaft 13 corresponding to the driver input angle are added to the input angle relating to lane keep torque calculation processing. The sum total of these angles is thus a rotation angle variation quantity of the lower steering shaft 13 generated by the override operation, that is, the variation quantity of the front wheel steering angle. Further, with respect to the rear wheel, the ARS final target angle $\theta_{ARS}$ is added as an input angle, and the variation quantity of the rear wheel, steering angle occurring in the override operation is also reflected in calculations of the lane keep torque.

As a result, the lane keep torque Tlk becomes a torque that accounts for the variation of steering angle occurring in the override operation performed by the driver and the variation of steering angle occurring in automatic steering, interference with the override operation is avoided, and the degradation of steering feel is advantageously restricted.

Meanwhile, the steering reaction torque in the override operation is greatly reduced and theoretically made equal or substantially equal to zero by the lane keep torque Tlk that makes it possible to obtain a practically useful effect inherent to the application. Thus, the steering load accompanying the override operation can be sufficiently decreased and the steering feel can be dissatisfying.

Accordingly, in the embodiment, the adequate steering feel is maintained by adding the pseudo steering reaction torque Tvt1 to the EPS final target torque Ttg. Therefore, the occurrence of uncomfortable feeling in the override operation can be reliably prevented by setting the pseudo steering reaction torque Tvt1 so as to obtain the steering feel that will be appropriate for the driver on the basis of experimental, empirical, or theoretical data or data obtained by simulation.

In the embodiment, this pseudo steering reaction torque Tvt1 is determined by the pseudo steering reaction torque characteristic term Tvt11 and pseudo steering reaction torque characteristic term Tvt12, but such a configuration is not limiting and a transmission function specifying various frequency responses can be also used. Where a simpler approach is followed, the pseudo steering reaction torque Tvt1 can be a fixed value.

The vehicle according to the embodiment is configured to enable steering of the front and rear wheel, but this is merely an example of configuration that can be used in the vehicle in accordance with the invention. For example, the vehicle in accordance with the invention may have a configuration in which the rear wheel steering angle variation function, primarily implemented by the ARS actuator 600, is removed from the vehicle 10, or a configuration in which the front wheel steering angle variation function, primarily implemented by the VGRS actuator 200, is removed. In this case, the above-described effect can be obtained by appropriately changing the abovementioned control operations according to the vehicle configuration.

The invention is not limited to the above-described embodiment and can be changed as appropriate without departing from the essence or concept of the invention that is defined by the claims and the entire detailed description of the invention, and a control device for a vehicle that incorporates such changes is also included in the technical scope of the invention.

The invention can be used, for example, in a vehicle having a function of keeping the target lane.

The invention claimed is:

1. A control device that controls a vehicle provided with a steering torque supply device that supplies a steering torque to a steering device coupled to a steered wheel and a steering transmission ratio variation device that changes a steering transmission ratio, the control device comprising:
    a setting unit that sets a target state quantity for keeping the vehicle in a target lane;
    a first control unit that controls the steering transmission ratio variation device so that a state quantity of the vehicle becomes the set target state quantity;
    a second control unit that controls the steering torque supply device so that a steering reaction restriction torque that restricts a steering reaction torque generated in the steering device is supplied with the steering device as the steering torque when the vehicle is kept within the target lane; and
    a correction unit that corrects the steering reaction restriction torque on the basis of a steering input when the steering input from a driver of the vehicle is produced.

2. The control device according to claim 1, wherein the correction unit corrects the steering reaction restriction torque on the basis of a steering direction relating to the steering input.

3. The control device according to claim 1, wherein the steering input is an input torque from the driver, and the correction unit corrects the steering reaction restriction torque on the basis of the input torque.

4. The control device according to claim 1, wherein the steering input is an input angle from the driver, and the correction unit corrects the steering reaction restriction torque on the basis of the input angle.

5. The control device according to claim 1, further comprising a third control unit that controls the steering torque supply device so that a predetermined pseudo steering reaction torque corresponding to the steering input is supplied as the steering torque.

6. The control device according to claim 1, wherein the second control unit supplies the steering reaction restriction torque so as to restrict at least one reaction torque from among a first steering reaction torque caused by physical characteristics of the steering device, a second steering reaction torque caused by physical characteristics of the steering torque supply device, and a third steering reaction torque caused by an axial force of the steered wheel.

7. The control device according to claim 6, wherein the second control unit supplies the steering reaction restriction torque so as to restrict at least one of the steering reaction torque caused by friction resistance of the steering device and the steering reaction torque caused by friction resistance of the steering torque supply device.

8. A control method for a vehicle provided with a steering torque supply device that supplies a steering torque to a steering device coupled to a steered wheel and a steering transmission ratio variation device that changes a steering transmission ratio, the control method comprising:
    setting a target state quantity for keeping the vehicle in a target lane;
    controlling the steering transmission ratio variation device so that a state quantity of the vehicle becomes the set target state quantity;
    controlling the steering torque supply device so that a steering reaction restriction torque that restricts a steering reaction torque generated in the steering device is supplied with the steering device as the steering torque when the vehicle is kept within the target lane; and
    correcting the steering reaction restriction torque on the basis of a steering input when the steering input from a driver of the vehicle is produced.

* * * * *